(12) United States Patent
Song

(10) Patent No.: US 8,165,195 B2
(45) Date of Patent: Apr. 24, 2012

(54) METHOD OF AND APPARATUS FOR VIDEO INTRAPREDICTION ENCODING/DECODING

(75) Inventor: Byung-cheol Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1439 days.

(21) Appl. No.: 11/713,684

(22) Filed: Mar. 5, 2007

(65) Prior Publication Data

US 2007/0206872 A1    Sep. 6, 2007

Related U.S. Application Data

(60) Provisional application No. 60/778,360, filed on Mar. 3, 2006.

(30) Foreign Application Priority Data

Apr. 28, 2006    (KR) ........................ 10-2006-0038861

(51) Int. Cl.
    *H04B 1/56*      (2006.01)
    *H04N 11/02*      (2006.01)

(52) U.S. Cl. ................ 375/240; 375/240.12; 375/240.13

(58) Field of Classification Search .................. 375/240, 375/240.12, 240.13, 240.24
See application file for complete search history.

(56) References Cited

U.S. PATENT DOCUMENTS

| | | | |
|---|---|---|---|
| 5,815,097 A | 9/1998 | Schwartz et al. | |
| 6,157,676 A | 12/2000 | Takaoka et al. | |
| 7,480,335 B2 * | 1/2009 | Payson | ..................... 375/240.25 |
| 2004/0258162 A1 * | 12/2004 | Gordon et al. | ........... 375/240.25 |
| 2005/0089094 A1 | 4/2005 | Yoo et al. | |
| 2005/0147165 A1 | 7/2005 | Yoo et al. | |
| 2005/0276326 A1 | 12/2005 | Drezner | |
| 2006/0029136 A1 | 2/2006 | Cieplinski et al. | |

FOREIGN PATENT DOCUMENTS

| | | |
|---|---|---|
| EP | 1761064 A2 | 3/2007 |
| JP | 63-001184 A | 1/1988 |
| JP | 4-219074 A | 8/1992 |
| JP | 8-186818 A | 7/1996 |
| JP | 11-75201 A | 3/1999 |

(Continued)

OTHER PUBLICATIONS

Zhao M et. al.: "Towards an Overview of Spatial Up-Conversion Techniques", Proceedings of ISCE, Sep. 24, 2002, pp. 23-26, XP008027127.

(Continued)

*Primary Examiner* — Hosuk Song
(74) *Attorney, Agent, or Firm* — Sughrue Mion, PLLC

(57) ABSTRACT

Provided is a method of and apparatus for video intraprediction encoding/decoding. The method of video intraprediction encoding includes dividing pixels of an input block into a plurality of groups, performing intraprediction encoding on pixels of a first group among the plurality of groups using pixels of a previously processed neighbor block, reconstructing the intraprediction-encoded pixels of the first group, determining a directivity of each pixel of the remaining groups using the reconstructed pixels of the first group and reconstructed pixels of previously processed other groups, and performing predictive encoding on the pixels of the remaining groups using the reconstructed pixels of the first group and the reconstructed pixels of the previously processed other groups according to the determined directivities and sequentially processing the pixels of the remaining groups in units of a group according to a predetermined order.

22 Claims, 27 Drawing Sheets

FOREIGN PATENT DOCUMENTS

| | | |
|---|---|---|
| JP | 2000-36963 A | 2/2000 |
| JP | 2005-198310 A | 7/2005 |

OTHER PUBLICATIONS

Wiegand T. et. al.: "Overview of the H.264/AVC video coding standard", IEEE Transactions on Circuits and Systems for Video Technology, IEEE Service Center, Piscataway ,NJ, US LNKD D01:10.1109/TCSVT.2003.815165, vol. 13, No. 7, Jul. 1, 2003, pp. 560-576, XP011221093, ISSN:1051-8215.

Woo-Jin Han et. al.: "Responses of CE1c: Intra-prediction; Pixel-interpolated prediction", ITU Study Group 16—Video Coding Experts Group—ISO/IEC MPEG & ITU-TVCEG(ISO/IEC JTC1/SC29/WG11 and ITU-T SG16 Q6), No. M11054, Jul. 13, 2004, XP030039833, p. 1-p. 6.

Marek Domanski et. al.: "AVC Video Coders With Spatial And Temporal Scalability", Picture Coding Symposium; Apr. 23-25, 2003, XP030080005 (6 pages).

Communication dated Nov. 30, 2010, issued in corresponding European Patent Application No. 07709091.8.

Communication dated Feb. 14, 2012, issued by the Japanese Patent Office in counterpart Japanese Application No. 2008-557213.

\* cited by examiner

: FIRST GROUP

METHOD OF AND APPARATUS FOR VIDEO INTRAPREDICTION ENCODING/DECODING

CROSS-REFERENCE TO RELATED PATENT APPLICATION

This application claims the benefit of U.S. Provisional Application No. 60/778,360, filed on Mar. 3, 2006, in the U.S. Patent and Trademark Office, and Korean Patent Application No. 10-2006-0038861, filed on Apr. 28, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to the intraprediction of a video, and more particularly, to video intraprediction encoding/decoding, in which a current block is divided into a plurality of groups, pixels of a first group are intrapredicted using pixels of a previously processed neighbor block of the current block, and pixels of the remaining groups are intrapredicted using reconstructed pixels of respective previous groups.

2. Description of the Related Art

According to a video compression standard such as moving picture expert group (MPEG)-1, MPEG-2, MPEG-4, H.264/MPEG-4/advanced video coding (AVC), a picture is divided into macroblocks for video encoding. After each of the macroblocks is encoded in all interprediction and intraprediction encoding modes, an appropriate encoding mode is selected according to the bit rate required for encoding the macroblock and the allowable distortion between the original macroblock and the decoded macroblock. Then the macroblock is encoded in the selected encoding mode.

In intraprediction, instead of referring to reference pictures, a prediction value of a macroblock to be encoded is estimated using the value of a pixel that is spatially adjacent to the macroblock to be encoded, and the difference between the prediction value and the original pixel value is encoded when encoding macroblocks of the current picture. Intraprediction modes are divided into 4×4 intraprediction modes for luminance components, 8×8 intraprediction modes (in case of a high profile), 16×16 intraprediction modes, and an intraprediction mode for chrominance components.

FIG. 1 illustrates 16×16 intraprediction modes for luminance components according to the H.264 standard, and FIG. 2 illustrates 4×4 intraprediction modes for luminance components according to the H.264 standard.

Referring to FIG. 1, there are four 16×16 intraprediction modes, i.e., a vertical mode, a horizontal mode, a direct current (DC) mode, and a plane mode. Referring to FIG. 2, there are nine 4×4 intraprediction modes, i.e., a vertical mode, a horizontal mode, a DC mode, a diagonal down-left mode, a diagonal down-right mode, a vertical right mode, a vertical left mode, a horizontal up mode, and a horizontal down mode.

For example, when a 4×4 current block is prediction encoded in a mode 0, i.e., the vertical mode of FIG. 2, pixel values of pixels A through D adjacent above the 4×4 current block are predicted to be the pixel values of the 4×4 current block. In other words, the pixel value of the pixel A is predicted to be the pixel values of the four pixels of the first column of the 4×4 current block, the pixel value of the pixel B is predicted to be the pixel values of the four pixels of the second column of the 4×4 current block, the pixel value of the pixel C is predicted to be the pixel values of the four pixels of the third column of the 4×4 current block, and the pixel value of the pixel D is predicted to be the pixel values of the four pixels of the fourth column of the 4×4 current block. Next, the difference between the pixel values of pixels of the 4×4 current block predicted using the pixels A through D and the actual pixel values of pixels included in the original 4×4 current block is obtained and encoded.

In video encoding according to the H.264 standard, the current macroblock is encoded in a total of 13 modes including the 4×4 intraprediction modes and the 16×16 intraprediction modes and is then intraprediction encoded in the encoding mode having the smallest cost. This means that the current macroblock is intrapredicted in the four 16×16 intraprediction modes and the one having the smallest cost is selected. Each of the 4×4 sub-blocks of the current macroblock is intrapredicted in the nine 4×4 intraprediction modes, and the one having the smallest cost is selected for each sub-block. The cost of the selected 16×16 intraprediction mode and the sum of the costs of the selected 4×4 intraprediction modes are compared, and the mode having the smallest cost is selected.

In this way, intraprediction according to the related art uses pixels sampled from neighboring blocks of the current block to be intrapredicted, instead of using pixels included in the current block. As a result, when the video of the current block is very different from that of the neighboring blocks, the difference between an intrapredicted block and an actual block may be large. Since intraprediction according to the related art uses only pixel information of neighboring blocks without using pixel information of the current block to be intrapredicted, prediction and coding efficiency are limited.

SUMMARY OF THE INVENTION

The present invention provides a method of and apparatus for video intraprediction encoding/decoding in which interpolated pixels of reconstructed pixels of a current block as well as pixels of neighbor blocks of the current block are used as predictors in video intraprediction, thereby improving prediction efficiency.

According to one aspect of the present invention, there is provided a method of video intraprediction encoding. The method includes dividing pixels of an input block into a plurality of groups, performing intraprediction encoding on pixels of a first group among the plurality of groups using pixels of a previously processed neighbor block, reconstructing the intraprediction-encoded pixels of the first group, determining a directivity of each pixel of the remaining groups using the reconstructed pixels of the first group and reconstructed pixels of previously processed other groups, and performing predictive encoding on the pixels of the remaining groups using the reconstructed pixels of the first group and the reconstructed pixels of the previously processed other groups according to the determined directivities and sequentially processing the pixels of the remaining groups in units of a group according to a predetermined order.

According to another aspect of the present invention, there is provided an apparatus for video intraprediction encoding. The apparatus includes a block division unit, a direction determination unit, and an intraprediction unit. The block division unit divides pixels of an input block into a plurality of groups. The direction determination unit determines a directivity of each pixel of the plurality of groups. The intraprediction unit performs intraprediction encoding on pixels of a first group among the plurality of groups using pixels of a previously processed neighbor block, sequentially processes pixels of the remaining groups in units of a group according to a predetermined order, and performs predictive encoding on the pixels of the remaining groups using the reconstructed pixels of the first group and the reconstructed pixels of the previously processed other groups according to the determined directivities.

According to another aspect of the present invention, there is provided a method of video intraprediction decoding. The method includes receiving a bitstream including data of pixels of a first group, which are intraprediction-encoded using pixels of a neighbor block, among a plurality of groups obtained by dividing an input block, and data of pixels that are intraprediction-encoded using reconstructed pixels of the first group and reconstructed pixels of previously processed other groups, determining a directivity of each pixel of the remaining groups, and predicting the pixels of the remaining groups using the decoded pixels of the first group and pixels of previously decoded other groups according to the determined directivities.

According to another aspect of the present invention, there is provided an apparatus for video intraprediction decoding. The apparatus includes an intraprediction mode determination unit and an intraprediction unit. The intraprediction mode determination unit receives a bitstream including data of pixels of a first group, which are intraprediction-encoded using pixels of a neighbor block, among a plurality of groups obtained by dividing an input block, and data of pixels that are intraprediction-encoded using reconstructed pixels of the first group and reconstructed pixels of previously processed other groups and determines an intraprediction mode using intraprediction mode information included in the received bitstream. The intraprediction unit performs intraprediction decoding on the pixels of the first group, determines a directivity of each pixel of the remaining groups, and predicts the pixels of the remaining groups using the decoded pixels of the first group and the decoded pixels of the previously processed other groups according to the determined directivities.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 3:
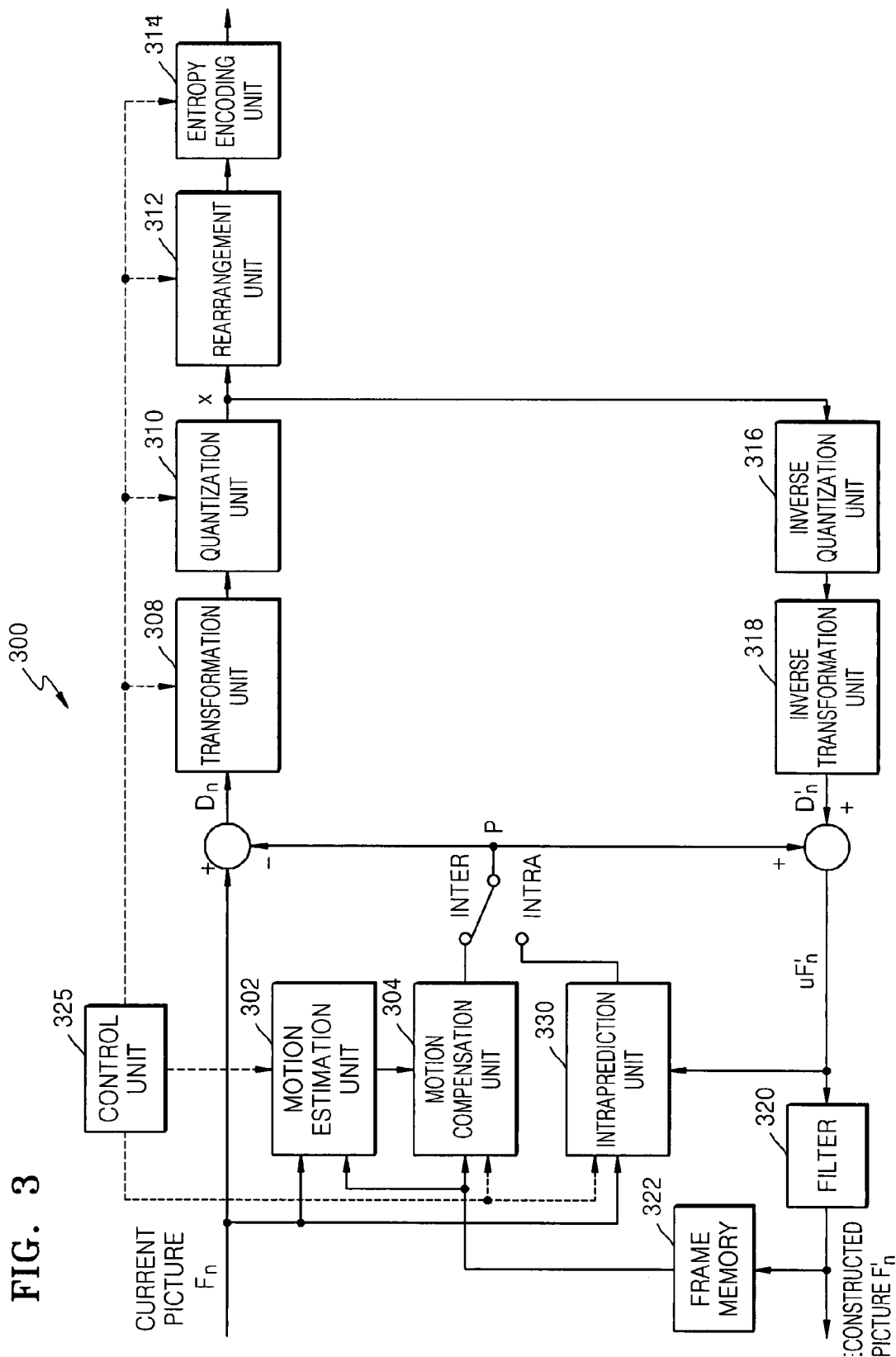
FIG. 3 is a block diagram of a video encoder which uses an apparatus for video intraprediction encoding according to an exemplary embodiment of the present invention.

FIG. 3 is a block diagram of a video encoder 300 which uses an apparatus for video intraprediction encoding according to an exemplary embodiment of the present invention. In the following description, for convenience of explanation, an apparatus for video intraprediction encoding according to an exemplary embodiment of the present invention is applied to a H.264 video encoder. However, the apparatus for video intraprediction encoding according to an exemplary embodiment of the present invention can also be applied to other compression methods using intraprediction.

Referring to FIG. 3, the video encoder 300 includes a motion estimation unit 302, a motion compensation unit 304, an intraprediction unit 330, a transformation unit 308, a quantization unit 310, a re-arrangement unit 312, an entropy-coding unit 314, an inverse quantization unit 316, an inverse transformation unit 318, a filter 320, a frame memory 322, and a control unit 325. The intraprediction unit 330 is the apparatus for video intraprediction encoding according to an exemplary embodiment of the present invention.

The motion estimation unit 302 and the motion compensation unit 304 search in a reference picture for a prediction value of a macroblock of the current picture for interprediction.

Figure 1:
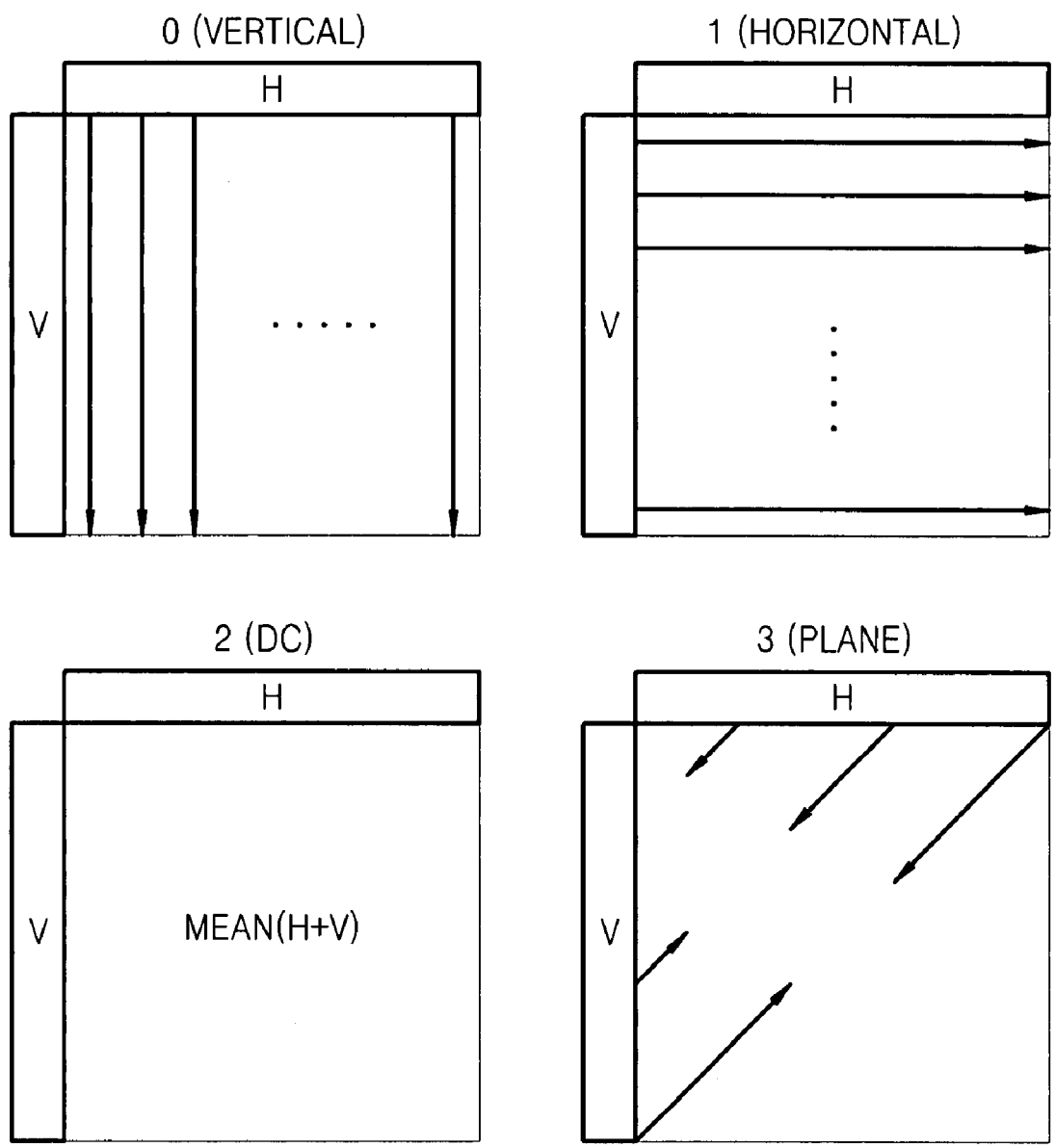
FIG. 1 illustrates 16×16 intraprediction modes for luminance components according to the H.264 standard.
Figure 2:
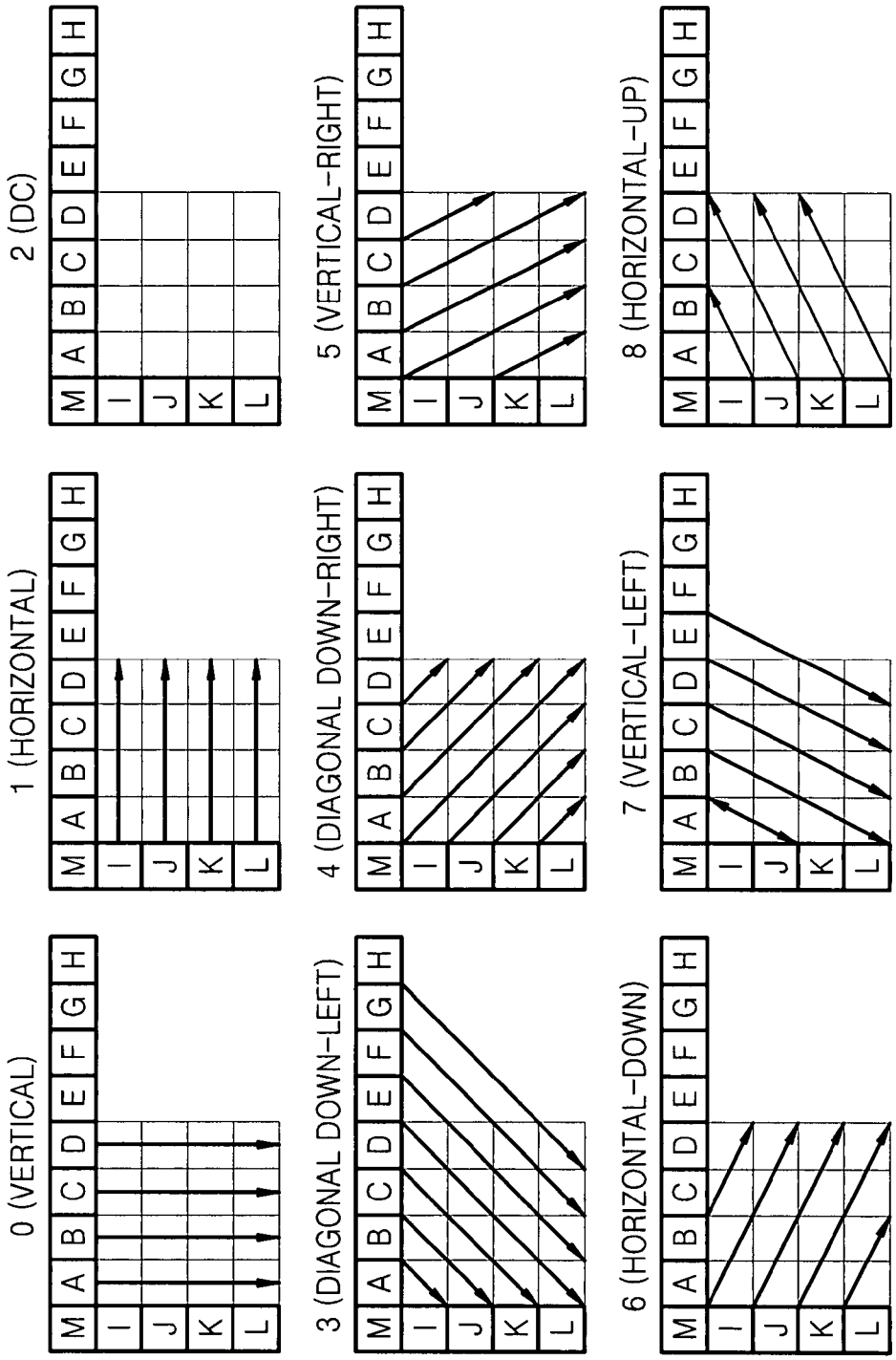
FIG. 2 illustrates 4×4 intraprediction modes for luminance components according to the H.264 standard.

The intraprediction unit 330 searches in the current picture for a prediction value of the current block for intraprediction. In particular, the intraprediction unit 330 according to an exemplary embodiment of the present invention receives the current block to be predicted and performs intraprediction encoding in 16×16 intraprediction modes, 4×4 intraprediction modes, or 8×8 intraprediction modes, and chrominance intraprediction modes as illustrated in FIGS. 1 and 2. The intraprediction unit 330 also divides the current block into a plurality of groups, performs intraprediction on one selected among the plurality of groups using a previously processed neighbor block like in the related art, and performs prediction on the remaining groups using reconstructed pixels of respective previous groups.

More specifically, the intraprediction unit 330 divides the current block into a plurality of groups and performs intraprediction on pixels of a first group among the plurality of groups using pixels of a neighbor block of the current block. The intraprediction unit 330 performs intraprediction on pixels of the remaining groups using the average of reference pixels that are selected based on directivities from among pixels of the first group in a predetermined direction around the pixels to be predicted and pixels of other previously processed groups. In this way, since a portion of the current block to be intrapredicted is first intrapredicted and the other portion is intrapredicted using reconstructed information of the previously intrapredicted portion, pixel information within the current block as well as pixels of a neighbor block can be used in intraprediction, thereby improving prediction efficiency.

The control unit 325 controls components of the video encoder 300 and determines a prediction mode for the current block. For example, the control unit 325 may determine a prediction mode that minimizes the difference between the interpredicted or intrapredicted block and the original block as the prediction mode for the current block. To achieve this, the control unit 325 calculates the costs of an interpredicted picture and an intrapredicted picture and determines the prediction mode which has the smallest cost to be the final prediction mode. Here, cost calculation may be performed using various methods such as a sum of absolute difference (SAD) cost function, a sum of absolute transformed difference (SATD) cost function, a sum of squares difference (SSD) cost function, a mean of absolute difference (MAD) cost function, and a Lagrange cost function. An SAD is a sum of absolute values of residues of 4×4 blocks. An SATD is a sum of absolute values of coefficients obtained by applying a Hadamard transform to residues of 4×4 blocks. An SSD is a sum of the squares of residues of 4×4 block prediction samples. An MAD is an average of absolute values of residues of 4×4 block prediction samples. The Lagrange cost function is a modified cost function including bitstream length information.

Once prediction data to be referred to by the current macroblock is found through interprediction or intraprediction, it is subtracted from the current macroblock in order to generate a residue. The generated residue is transformed into a frequency domain by the transformation unit 308 and then quantized by the quantization unit 310. The entropy coding unit 314 encodes the quantized residue in order to output a bitstream.

To obtain a reference picture used for interprediction, a quantized picture is processed by the inverse quantization unit 316 and the inverse transformation unit 318, and thus the current picture is reconstructed. The reconstructed current picture is processed by the filter 320 performing deblocking filtering, and is then stored in the frame memory 322 for use in interprediction of the next picture. Reconstructed video data of the first group prior to deblocking filtering is input to the intraprediction unit 330 to be used as reference data for prediction of pixels of the remaining groups.

Figure 4:
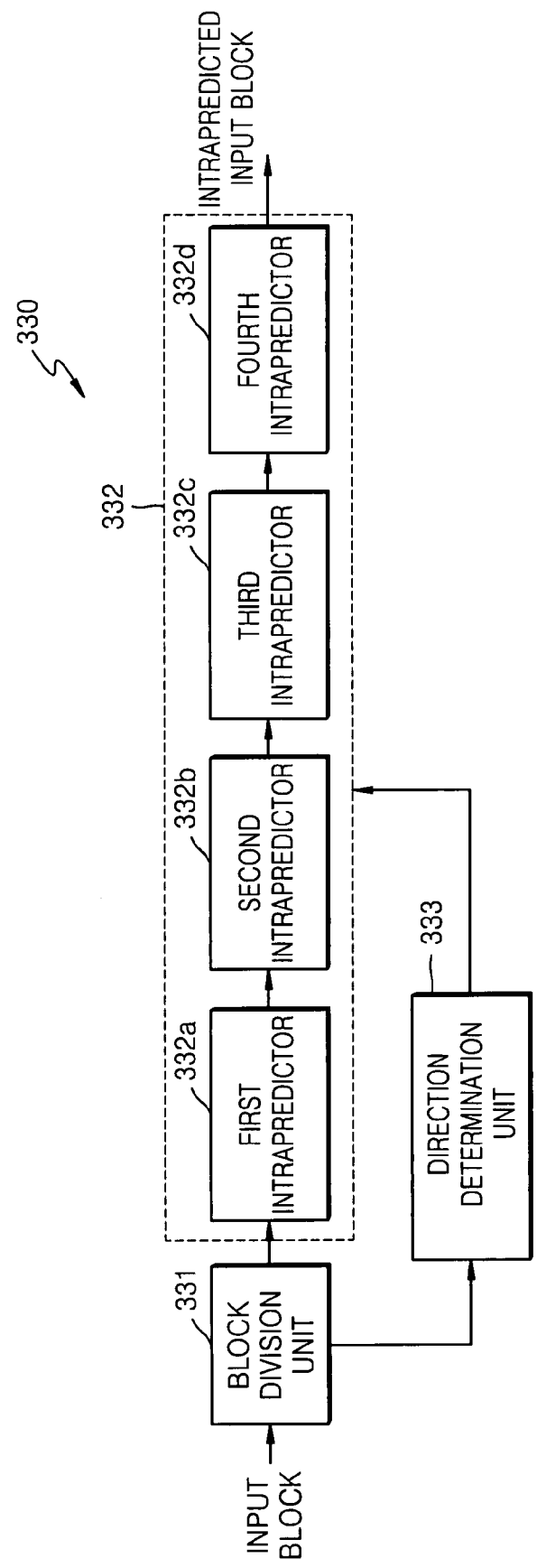
FIG. 4 is a block diagram of an intraprediction unit of FIG. 3 according to the an exemplary embodiment of present invention.
Figure 5:
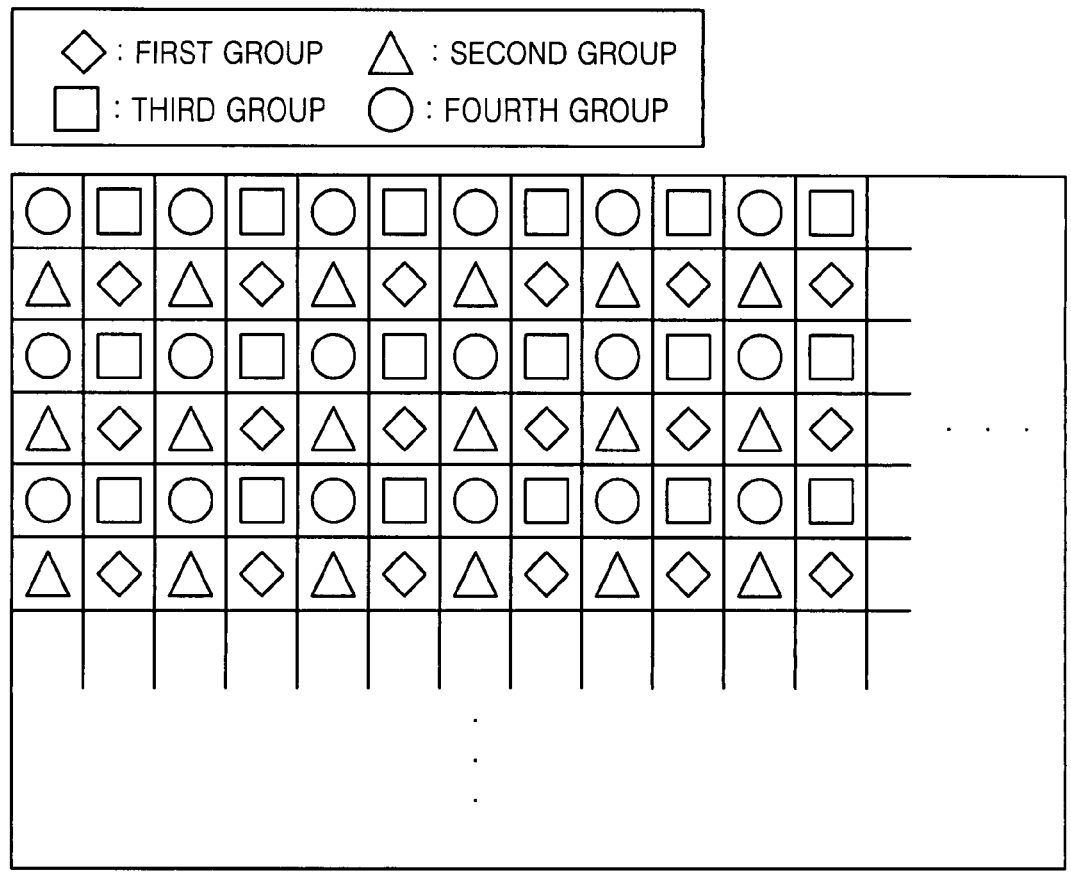
FIG. 5 illustrates an input block that is divided by a block division unit of FIG. 4.

FIG. 4 is a block diagram of the intraprediction unit 330 of FIG. 3 according to an exemplary embodiment of the present invention, and FIG. 5 illustrates an input block divided by the block division unit 331 of FIG. 4.

Referring to FIG. 4, the intraprediction unit 330 according to an exemplary embodiment of the present invention includes the block division unit 331, an intrapredictor 332, and a direction determination unit 333. The intrapredictor 332 includes intrapredictors for processing each of the plurality of groups obtained by dividing the input block. In FIG. 4, the intrapredictor 332 includes a first intrapredictor 332a, a second intrapredictor 332b, a third intrapredictor 332c, and a fourth intrapredictor 332d to process four groups obtained by dividing the input block.

Figure 6:
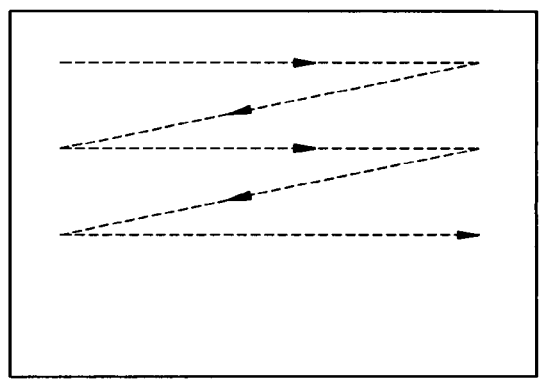
FIG. 6 illustrates the processing order of blocks in a frame according to an exemplary embodiment of the present invention.

The block division unit 331 divides pixels of the input block into a plurality of groups including at least two groups. For example, as illustrated in FIG. 5, the block division unit 331 may divide pixels of an input 16×16 block into four groups. Referring to FIG. 5, the first group includes pixels in even-numbered rows and even-numbered columns among pixels of the input block, the second group includes pixels located on the left and right sides of the pixels of the first group, the third group includes pixels located above and below the pixels of the first group, and the fourth group includes the remaining pixels that are not included in the first through third groups. Similarly, pixels of an input block can be divided into groups even when the input block has a size of M×N (M=2m, N=2n, and m and n are positive integers) instead of 16×16. The first group includes pixels selected for efficient spatial interpolation prediction with respect to the other groups according to a raster scan processing order as illustrated in FIG. 6, i.e., the processing order of blocks in which the blocks are sequentially processed left-to-right and top-to-bottom.

Figure 7:
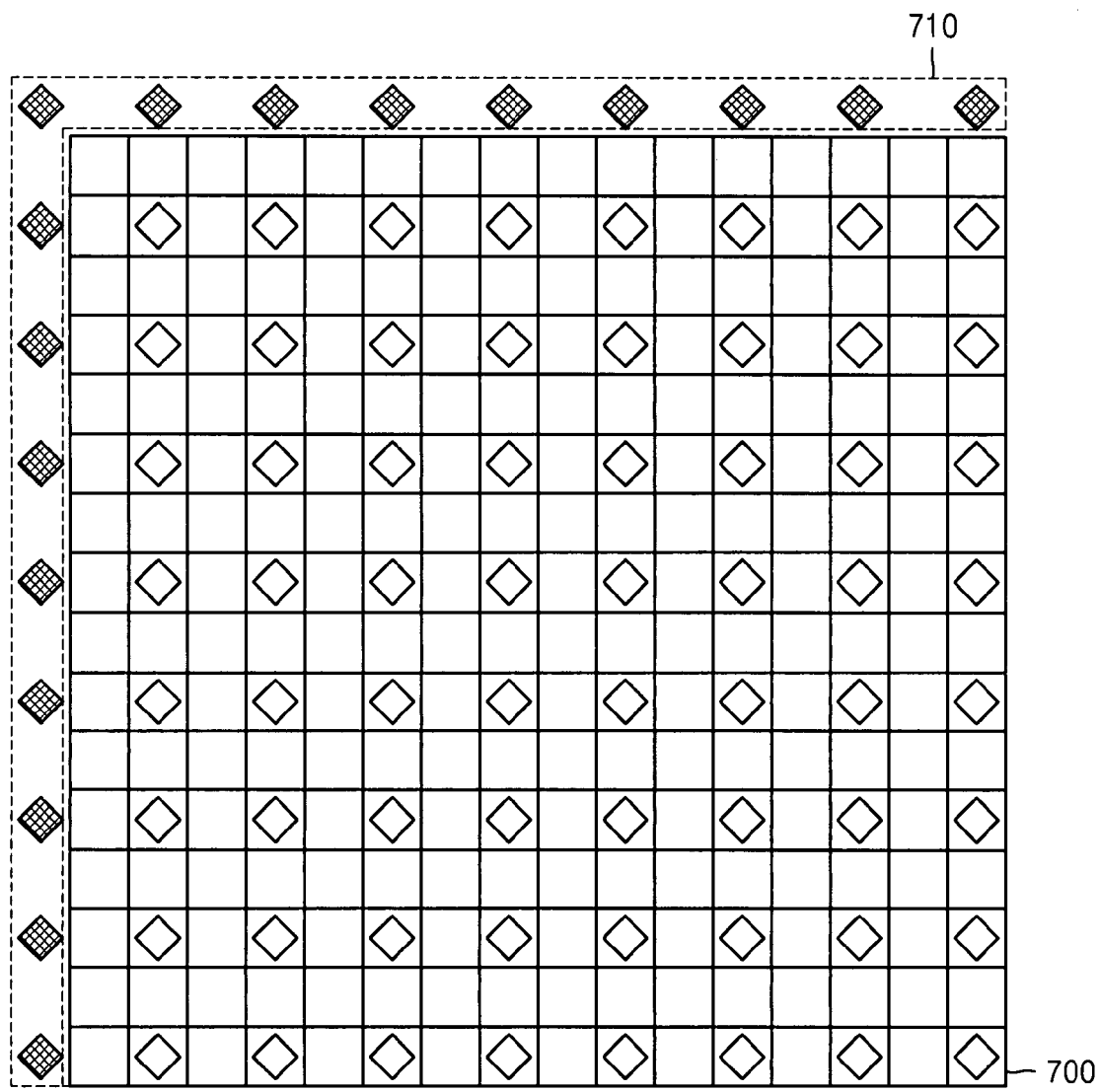
FIG. 7 illustrates pixels of a first group divided by the block division unit of FIG. 4 according to an exemplary embodiment of the present invention.
Figure 8:
FIG. 8 is a view for explaining intraprediction with respect to the pixels of the first group according to an exemplary embodiment of the present invention.

FIG. 7 illustrates the pixels of the first group divided by the block division unit 331 according to an exemplary embodiment of the present invention, and FIG. 8 is a view for explaining intraprediction with respect to the pixels of the first group according to an exemplary embodiment of the present invention. In FIG. 8, $P_{x,y}$ indicates a pixel in an $x^{th}$ column and a $y^{th}$ row of an input current block 800.

The first intrapredictor 332a first performs intraprediction on the pixels of the first group using pixels of a neighbor block of the current block. At this time, intraprediction according to the H.264 standard or other intraprediction methods using pixels of a neighbor block may be applied. For example, in intraprediction according to the vertical mode, the first intrapredictor 332a first predicts pixel values of pixels $V_2$, $V_4$, $V_6$, ..., $V_{14}$, $V_{16}$ that are adjacent above the current block and located in the same columns as the pixels of the first group to be the pixel values of the pixels of the first group of the current block. In other words, the pixel value of the pixel $V_2$ is predicted to be the pixel values of 8 pixels of the second column of the first group, the pixel value of the pixel $V_4$ is predicted to be the pixel values of 8 pixels of the fourth column of the first group, and the pixel value of the pixel $V_6$ is predicted to be the pixel values of 8 pixels of the sixth column of the first group. In this way, the pixels of the first group are intrapredicted using pixels of a neighbor block of the current block. After the first intrapredictor 332a performs intraprediction according to various intraprediction modes such as a horizontal mode, it compares the costs of the intraprediction modes according to the difference between the intrapredicted first group and a portion of the original image corresponding to the first group in each intraprediction mode in order to determine the intraprediction mode for the first group.

The residue, which is a difference between the intrapredicted first group and the original pixels of the current block corresponding to the first group, is transformed by the transformation unit 308 and then quantized by the quantization unit 310. The quantized residue of the first group undergoes the inverse quantization unit 316 and the inverse transformation unit 318 and is added to the intrapredicted first group for reconstruction. The reconstructed first group is stored in the frame memory 322.

Figure 9:
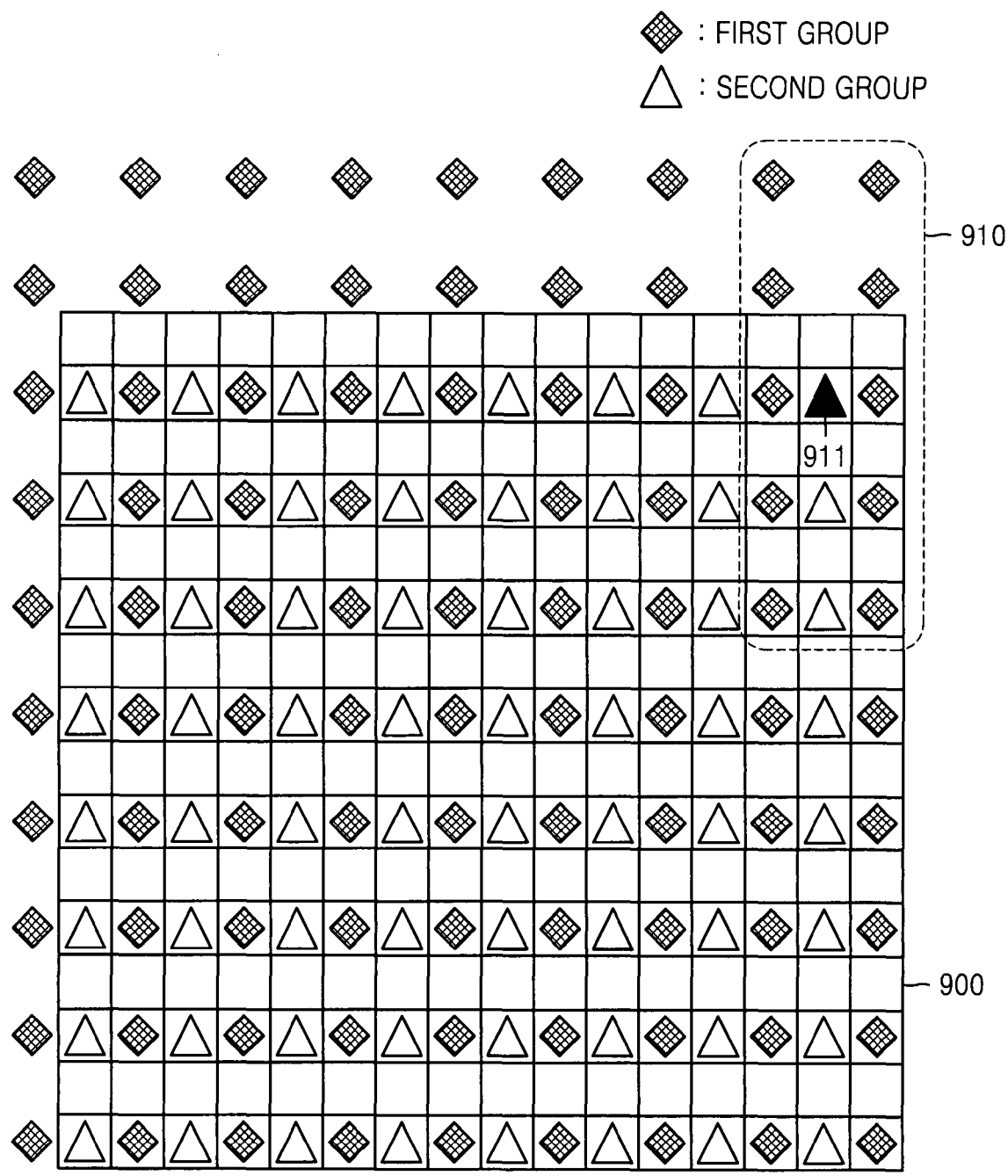
FIG. 9 illustrates pixels of the first group required for intraprediction with respect to pixels of a second group according to an exemplary embodiment of the present invention.

FIG. 9 illustrates pixels of the first group required for intraprediction with respect to the pixels of the second group according to an exemplary embodiment of the present invention.

Referring to FIG. 9, the pixels of the second group marked with triangles are predicted using pixels of the previously processed first group. For example, a pixel 911 of the second group may be predicted using pixels of the first group included in a dotted line 910. At this time, to determine reference pixels of the first group used for prediction of a pixel of the second group, the direction determination unit 333 determines a directivity around the pixel of the second group.

Figure 10:
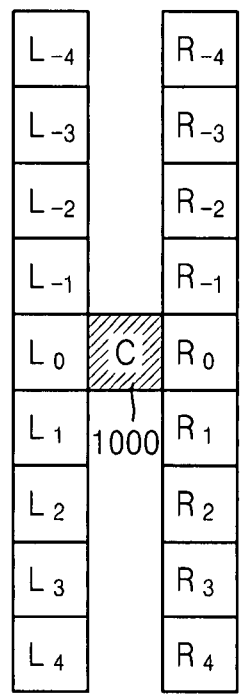
FIGS. 10 and 11A through 11I are views for explaining a process of determining directivities around the pixels of the second group according to an exemplary embodiment of the present invention.
Figure 11A:
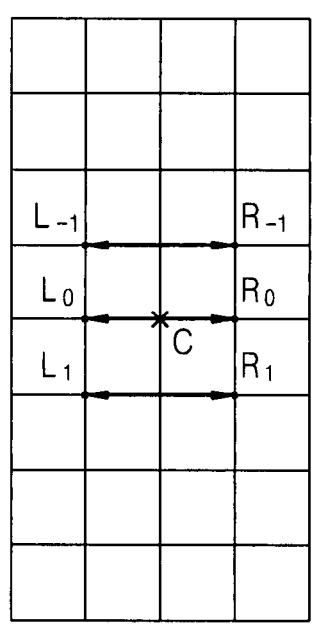
Figure 11B:
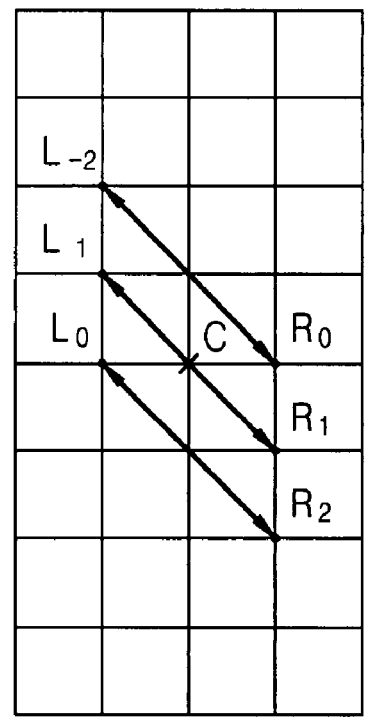
Figure 11C:
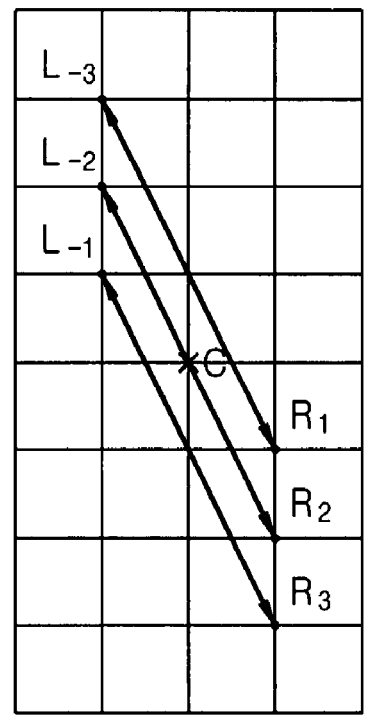
Figure 11D:
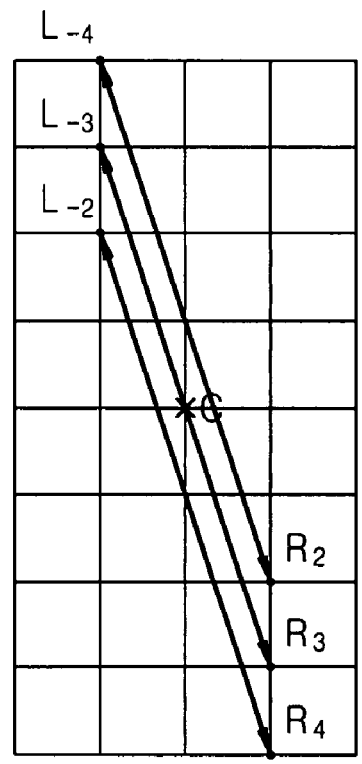
Figure 11E:
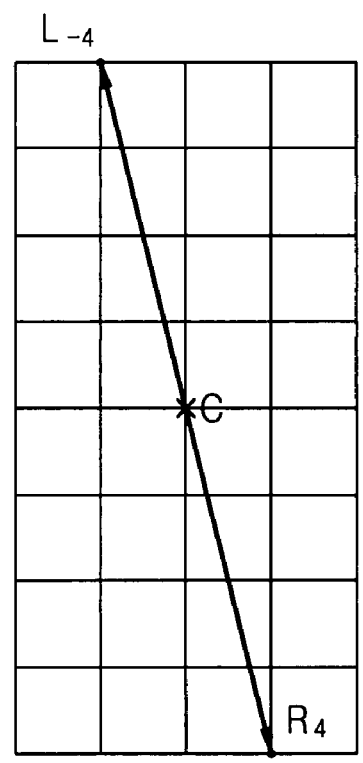
Figure 11F:
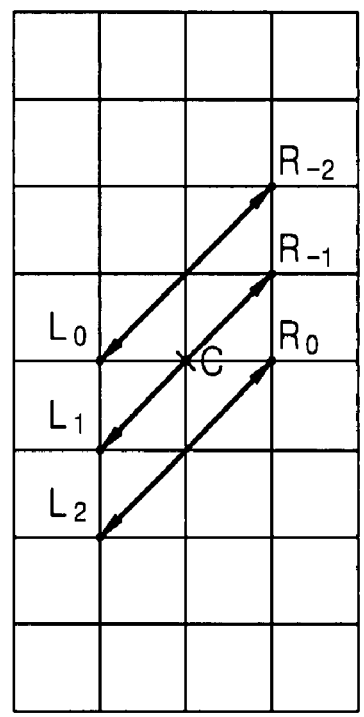
Figure 11G:
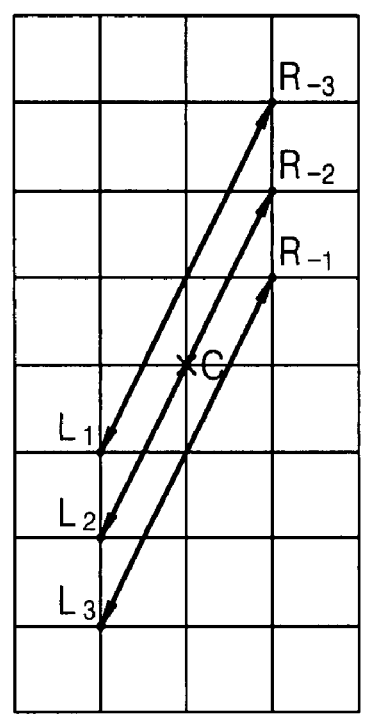
Figure 11H:
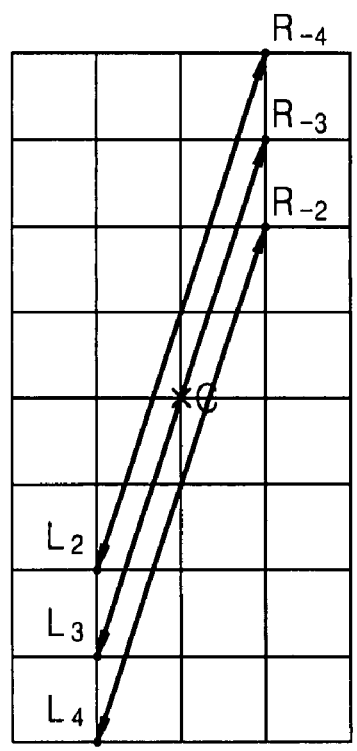
Figure 11I:
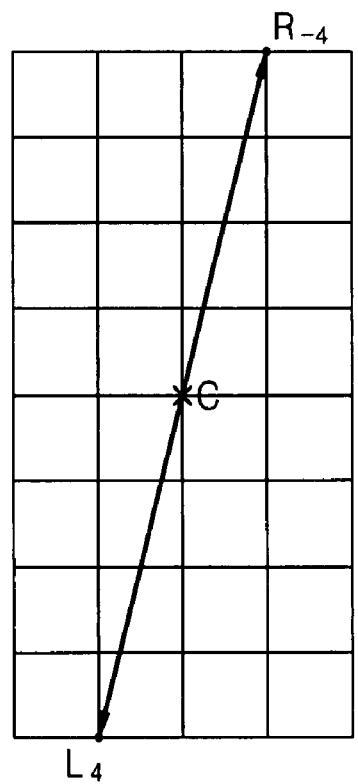

FIGS. 10 and 11A through 11I are views for explaining a process of determining a directivity around a pixel of the second group according to an exemplary embodiment of the present invention. In FIG. 10, a pixel 1000 of the second group to be predicted is indicated by C and pixels adjacent to the left and right of the pixel 1000 are indicated by $L_i$ and $R_j$ (i, j=−4, −3, −2, −1, 0, 1, 2, 3, 4). Here, $L_{-4}$, $L_{-2}$, $L_0$, $L_2$, $L_4$, $R_{-4}$, $R_{-2}$, $R_0$, $R_2$, and $R_4$ are reconstructed pixels of the first group. In $L_n$, if n is an odd number, $L_n$ has an average between $L_{n-1}$ and $L_{n+1}$. In $R_n$, if n is an odd number, $R_n$ has an average between $R_{n-1}$ and $R_{n+1}$.

Referring to FIGS. 11A through 11I, directivity coefficients D1 through D9 are calculated by calculating an average of differences between absolute values of neighbor pixels of the pixel C of the second group as follows:

$$D1=(|L_{-1}-R_{-1}|+|L_0-R_0|+|L_1-R_1|)/3 \text{(FIG. 11A)};$$

$$D2=(|L_{-2}-R_0|+|L_{-1}-R_1|+|L_0-R_2|)/3 \text{(FIG. 11B)};$$

$$D3=(|L_{-3}-R_1|+|L_{-2}-R_2|+|L_{-1}-R_3|)/3 \text{(FIG. 11C)};$$

$$D4=(|L_{-4}-R_2|+|L_{-3}-R_3|+|L_{-2}-R_4|)/3 \text{(FIG. 11D)};$$

$$D5=|L_{-4}-R_4| \text{(FIG. 11E)};$$

$$D6=(|L_0-R_{-2}|+|L_1-R_{-1}|+|L_2-R_0|)/3 \text{(FIG. 11F)};$$

$$D7=(|L_1-R_{-3}|+|L_2-R_{-2}|+|L_3-R_{-1}|)/3 \text{(FIG. 11G)};$$

$$D8=(|L_2-R_{-4}|+|L_3-R_{-3}|+|L_4-R_{-2}|)/3 \text{(FIG. 11H)};$$

$$D9=|L_4-R_{-4}| \text{(FIG. 11I)} \qquad \text{EQN. [1]}$$

The direction determination unit 333 selects the smallest directivity coefficient among the calculated directivity coefficients D1 through D9 and determines reconstructed pixels of the first group in a direction corresponding to the selected directivity coefficient as reference pixels. Here, the determination of the direction is not limited to the above description, but weights may be applied to the differences between the absolute values of the neighbor pixels of the pixel of the second group according to distances from the neighbor pixels to the pixel of the second group or other various directivity measurement algorithms may be used.

Referring back to FIG. 10, if the directivity coefficient D1 is selected, the second intrapredictor 332b determines reconstructed pixels $L_0$ and $R_0$ of the first group corresponding to the directivity coefficient D1 as reference pixels and uses an average $(L_0+R_0)/2$ of the reference pixels as a predictor for the pixel C of the second group. In other words, the pixel C of the second group is predicted to be $(L_0+R_0)/2$. If the directivity coefficient D2 is selected, the second intrapredictor 332b uses $(L_{-2}+R_0+L_0+R_2)/4$ as the predictor for the pixel C of the second group. If the directivity coefficient D3 is selected, the second intrapredictor 332b uses $(L_{-2}+R_2)/2$ as the predictor for the pixel C of the second group. If the directivity coefficient D4 is selected, the second intrapredictor 332b uses $(L_{-4}+R_2+L_{-2}+R_4)/4$ as the predictor for the pixel C of the second group. If the directivity coefficient D5 is selected, the second intrapredictor 332b uses $(L_{-4}+R_4)/2$ as the predictor for the pixel C of the second group. If the directivity coefficient D6 is selected, the second intrapredictor 332b uses $(L_0+R_{-2}+L_2+R_0)/4$ as the predictor for the pixel C of the second group. If the directivity coefficient D7 is selected, the second intrapredictor 332b uses $(L_2+R_{-2})/2$ as the predictor for the pixel C of the second group. If the directivity coefficient D8 is selected, the second intrapredictor 332b uses $(L_2+R_{-4}+L_4+R_{31\ 2})/4$ as the predictor for the pixel C of the second group. If the directivity coefficient D9 is selected, the second intrapredictor 332b uses $(L_4+R_{-4})/2$ as the predictor for the pixel C of the second group.

The directivity coefficients D1 through D9 may be generated using only reconstructed pixels of the first group as follows:

$$D1=(|L_{-2}-R_{-2}|+|L_0-R_0|+|L_2-R_2|)/3;$$

$$D2=(|L_{-2}-R_0|+|L_0-R_2|)/2;$$

$$D3=(|L_{-4}-R_0|+|L_{-2}-R_2|+|L_0-R_4|)/3;$$

$$D4=(|L_{-4}-R_2|+|L_{-2}-R_4|)/2;$$

$$D5=|L_{-4}-R_4|;$$

$$D6=(|L_0-R_{-2}|+|L_2-R_0|)/2;$$

$$D7=(|L_0-R_{-4}|+|L_2-R_{-2}|+|L_4-R_0|)/3;$$

$$D8=(|L_2-R_{-4}|+|L_4-R_{-2}|)/2;$$

$$D9=|L_4-R_{-4}| \qquad \text{EQN. [2]}$$

The determination of the direction and the determination of the reference pixels for prediction with respect to the remaining groups are similar to those described above and thus will not described.

As mentioned above, each of the pixels of the second group is predicted using reconstructed pixels of the previously processed first group according to a direction determined by the direction determination unit 333. Once prediction values for all the pixels of the second group are generated, a residue between prediction values and pixels of the input block corresponding to the second group is calculated. The residue is transformed by the transformation unit 308 and then quantized by the quantization unit 310. The quantized residue of the second group passes through the inverse quantization unit 316 and the inverse transformation unit 318, is added to the prediction value of the second group for reconstruction, and then is stored in the frame memory 322.

Figure 12:
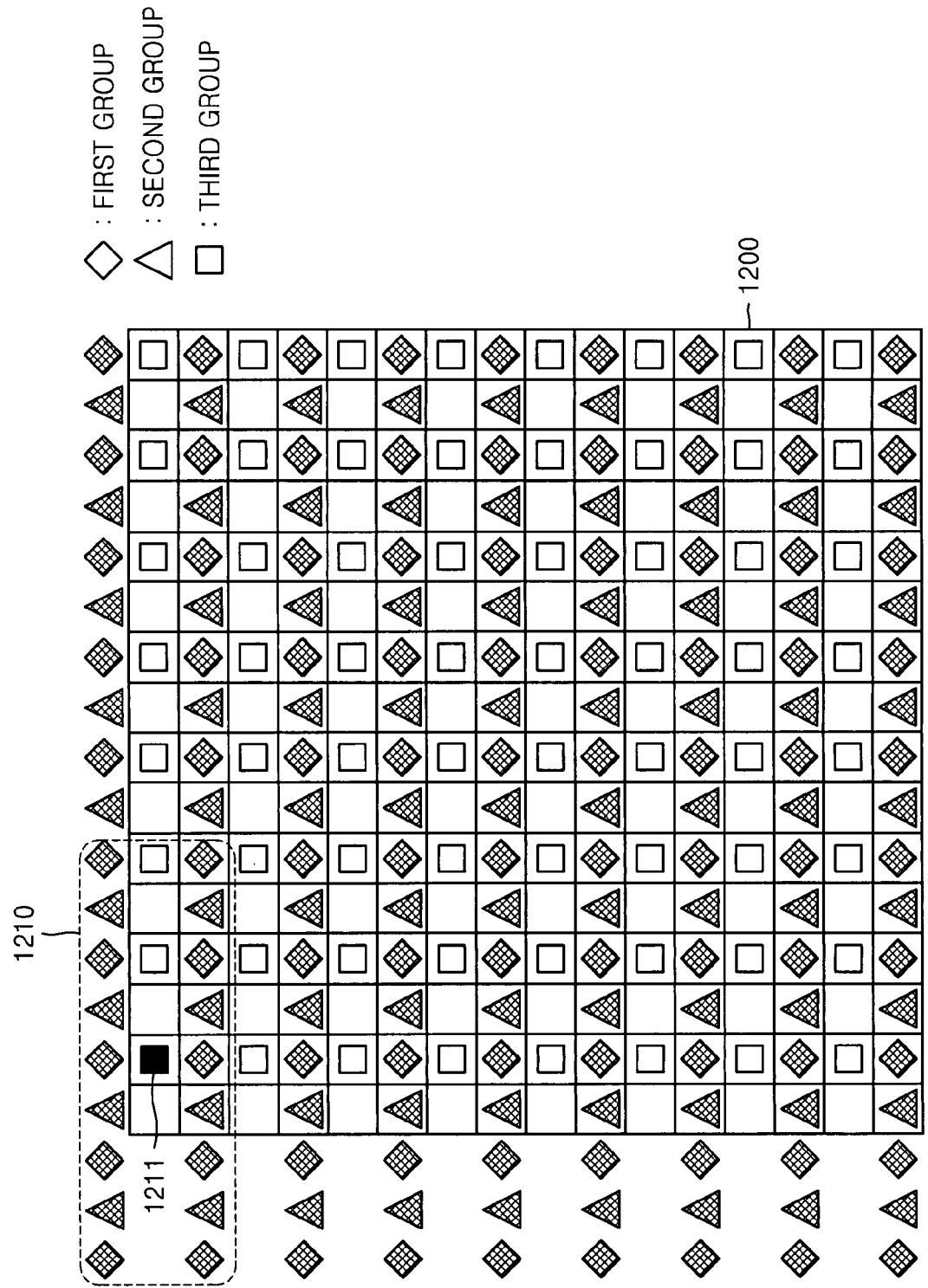
FIG. 12 illustrates pixels of the second group required for intraprediction with respect to pixels of a third group according to an exemplary embodiment of the present invention.

FIG. 12 illustrates pixels of the first group and the second group required for intraprediction with respect to pixels of the third group according to an exemplary embodiment of the present invention.

Referring to FIG. 12, the pixels of the third group are predicted using reconstructed pixels of the previously processed first group and second group. For example, a pixel 1211 of the third group may be predicted using reconstructed pixels of the first group and the second group included in the current block and a previously processed neighbor block of the current block in a dotted line 1210. Like prediction with respect to the pixels of the second group, in order to determine reference pixels of the first group and the second group used for prediction with respect to the pixels of the third group, the direction determination unit 333 determines a directivity around a pixel of the third group.

Figure 13:
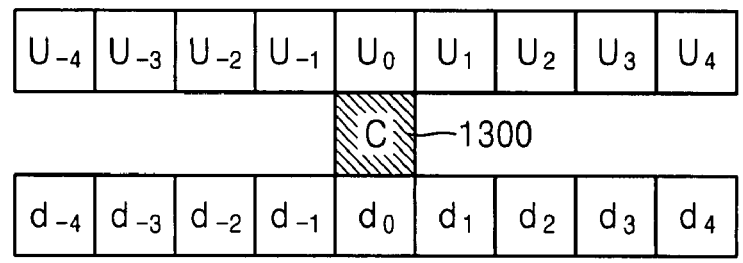
FIGS. 13 and 14A through 14I are views for explaining a process of determining directivities around the pixels of the third group according to an exemplary embodiment of the present invention.
Figure 14A:
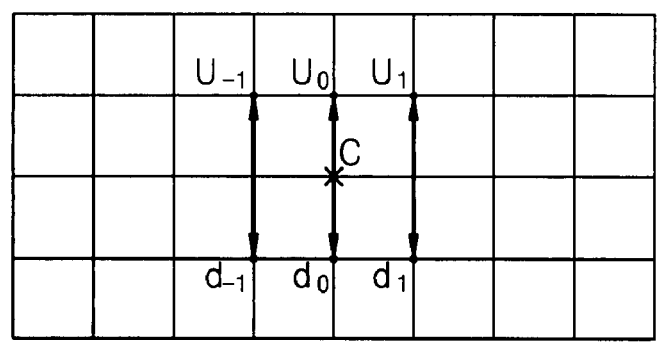
Figure 14B:
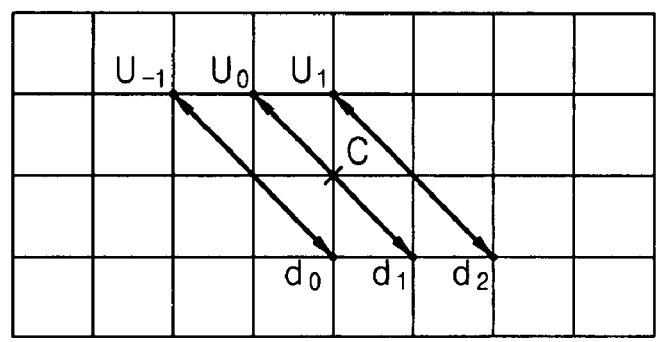
Figure 14C:
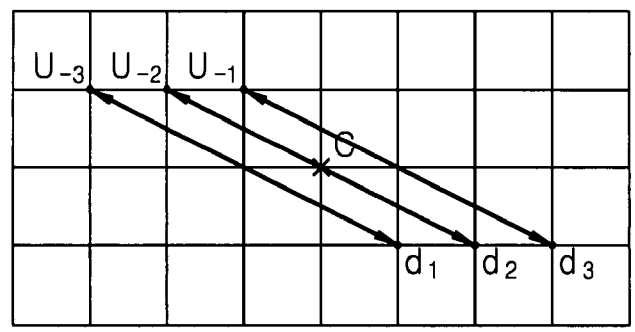
Figure 14D:
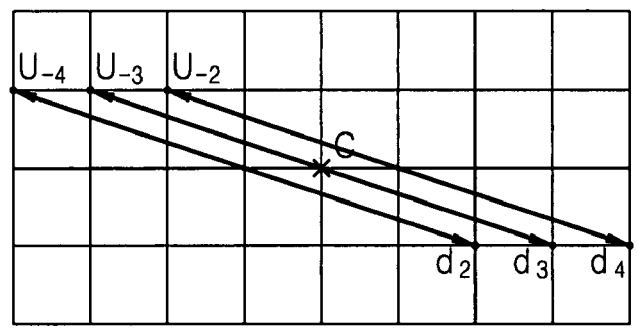
Figure 14E:
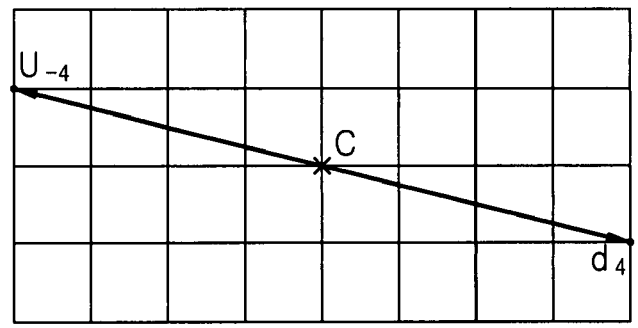
Figure 14F:
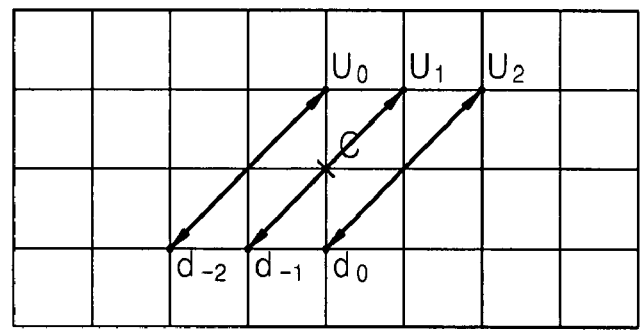
Figure 14G:
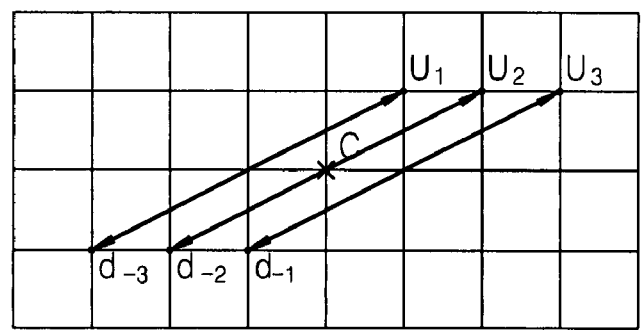
Figure 14H:
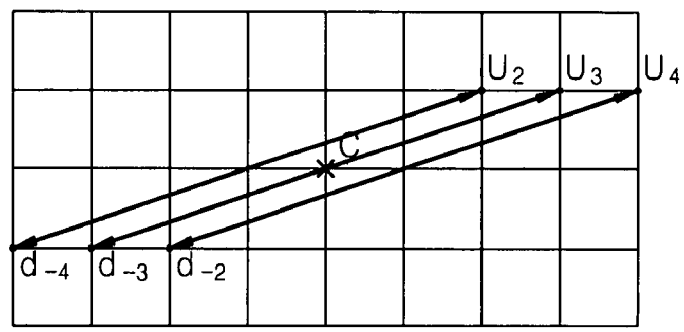
Figure 14I:
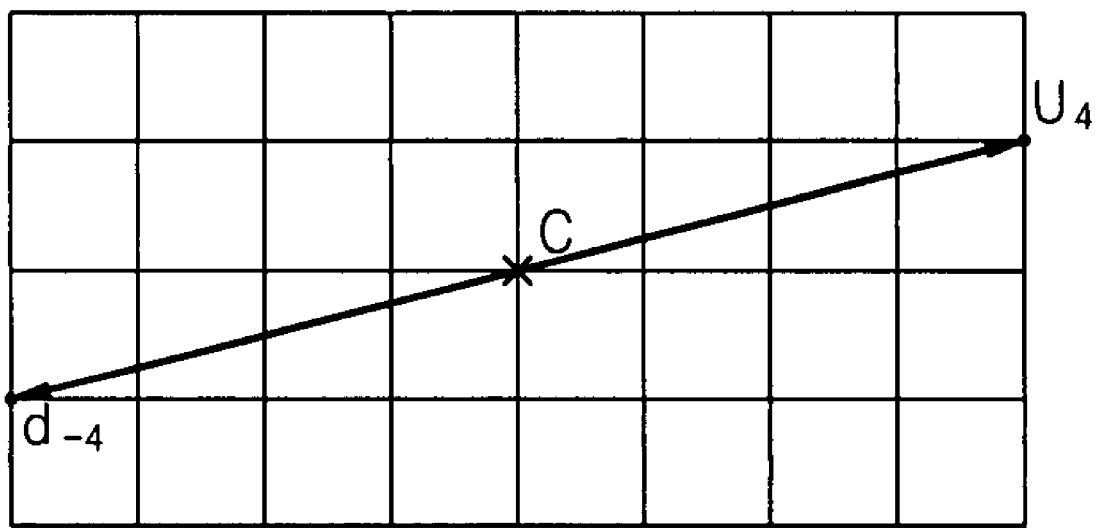

FIGS. 13 and 14A through 14I are views for explaining a process of determining directivities around the pixels of the third group according to an exemplary embodiment of the present invention. In FIG. 13, a pixel 1300 of the third group is indicated by C and pixels adjacent above and below the pixel 1300 are indicated by $U_i$ and $d_j$ (i, j=−4, −3, −2, −1, 0, 1, 2, 3, 4). Here, $U_{-4}$, $U_{-2}$, $U_0$, $U_2$, $U_4$, $d_{-4}$, $d_{-2}$, $d_0$, $d_2$, and $d_4$ are reconstructed pixels of the first group and $U_{-1}$, $U_{-3}$, $U_1$, $U_3$, $d_{-1}$, $d_{-3}$, $d_1$, and $d_3$, are reconstructed pixels of the second group.

Referring to FIGS. 14A through 14I, directivity coefficients D1 through D9 are calculated by calculating an average of differences between absolute values of neighbor pixels of the pixel C of the third group as follows:

$$D1=(|U_{-1}-d_{-1}|+|U_0-d_0|+|U_1-d_1|)/3 (\text{FIG. } 14A);$$

$$D2=(|U_{-2}-d_0|+|U_{-1}-d_1|+|U_0-d_2|)/3 (\text{FIG. } 14B);$$

$$D3=(|U_{-3}-d_1|+|U_{-2}-d_2|+|U_{-1}-d_3|)/3 (\text{FIG. } 14C);$$

$$D4=(|U_{-4}-d_2|+|U_{-3}-d_3|+|U_{-2}-d_4|)/3 (\text{FIG. } 14D);$$

$$D5=|U_{-4}-d_4| (\text{FIG. } 14E);$$

$$D6=(|U_0-d_{-2}|+|U_1-d_{-1}|+|U_2-d_0|)/3 (\text{FIG. } 14F);$$

$$D7=(|U_1-d_{-3}|+|U_2-d_{-2}|+|U_3-d_{-1}|)/3 (\text{FIG. } 14G);$$

$$D8=(|U_2-d_{-4}|+|U_3-d_{-3}|+|U_4-d_{-2}|)/3 (\text{FIG. } 14H);$$

$$D9=|U_4-d_{-4}| (\text{FIG. } 14I) \qquad \text{EQN. [3]}$$

The direction determination unit 333 selects the smallest directivity coefficient among the calculated directivity coefficients D1 through D9 and determines reconstructed pixels of the first group and the second group in a direction corresponding to the selected directivity coefficient as reference pixels.

Once the direction determination unit 333 determines a directivity around a pixel of the third group, the third intrapredictor 332c predicts the pixel of the third group using the reconstructed pixels of the first group or the second group according to the determined directivity.

Referring back to FIG. 13, if the directivity coefficient D1 is selected, the third intrapredictor 332c determines reconstructed pixels $U_0$ and $d_0$ of the first group corresponding to the directivity coefficient D1 as reference pixels and uses an average $(U_0+d_0)/2$ of the reference pixels as a predictor for the pixel C of the third group. In other words, the pixel C of the third group is predicted to be $(U_0+d_0)/2$. If the directivity coefficient D2 is selected, the third intrapredictor 332c uses $(U_{-1}+d_1)/2$ as the predictor for the pixel C of the third group. If the directivity coefficient D3 is selected, the third intrapredictor 332c uses $(U_{-2}+d_2)/2$ as the predictor for the pixel C of the third group. If the directivity coefficient D4 is selected, the third intrapredictor 332c uses $(U_{-3}+d_3)/2$ as the predictor for the pixel C of the third group. If the directivity coefficient D5 is selected, the third intrapredictor 332c uses $(U_{-4}+d_4)/2$ as the predictor for the pixel C of the third group. If the directivity coefficient D6 is selected, the third intrapredictor 332c uses $(U_1+d_{-1})/2$ as the predictor for the pixel C of the third group. If the directivity coefficient D7 is selected, the third intrapredictor 332c uses $(U_2+d_{-2})/2$ as the predictor for the pixel C of the third group. If the directivity coefficient D8 is selected, the third intrapredictor 332c uses $(U_3+d_{-3})/2$ as the predictor for the pixel C of the third group. If the directivity coefficient D9 is selected, the third intrapredictor 332c uses $(U_4+d_{-4})/2$ as the predictor for the pixel C of the third group.

As mentioned above, each of the pixels of the third group is predicted using reconstructed pixels of the previously processed first group and second group according to a direction determined by the direction determination unit 333. Once prediction values for all the pixels of the third group are generated, a residue between prediction values of the third group and pixels of the input block corresponding to the third group is calculated. The residue is transformed by the transformation unit 308 and then quantized by the quantization unit 310. The quantized residue of the third group passes through the inverse quantization unit 316 and the inverse transformation unit 318, is added to the prediction value of the third group for reconstruction, and then is stored in the frame memory 322.

Figure 15:
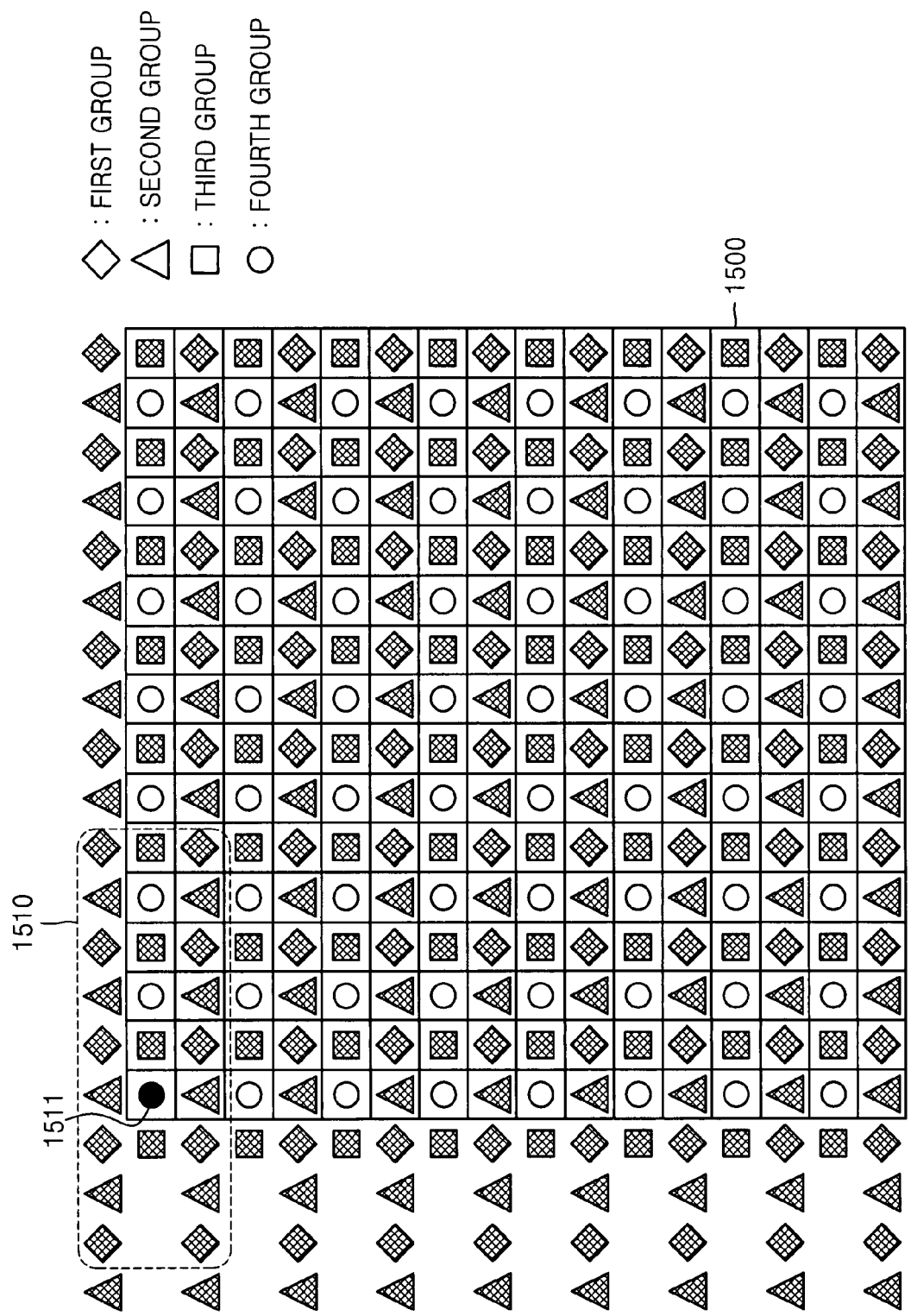
FIG. 15 illustrates reconstructed pixels of the first through third groups required for intraprediction with respect to pixels of a fourth group according to an exemplary embodiment of the present invention.

FIG. 15 illustrates reconstructed pixels of the first through third groups required for intraprediction with respect to pixels of a fourth group according to an exemplary embodiment of the present invention.

Referring to FIG. 15, pixels of the fourth group are predicted using reconstructed pixels of the previously processed first through third groups. For example, a pixel 1511 of the fourth group may be predicted using reconstructed pixels of the first through third groups included in the current block and a previously processed neighbor block of the current block in a dotted line 1510. Like prediction with respect to the pixels of the second group and the third group, in order to determine reference pixels of the first through third groups used for prediction with respect to the pixels of the fourth group, the direction determination unit 333 determines a directivity around a pixel of the fourth group. Like prediction with respect to the pixels of the third group described with reference to FIGS. 13 and 14A through 14I, the pixel of the fourth group is predicted using reconstructed pixels of the first through third groups. However, in the determination of the directivity around the pixel of the fourth group, a directivity coefficient D10 may be additionally calculated using an average of differences between absolute values of pixels of the third group located to the left and right of the pixel of the fourth group.

Once prediction values for all the pixels of the fourth group are generated using reconstructed pixels of the first through third groups, a residue between prediction values of the fourth group and pixels of the input block corresponding to the fourth group is calculated. The residue is transformed by the transformation unit 308 and then quantized by the quantization unit 310. The quantized residue of the fourth group passes through the inverse quantization unit 316 and the inverse transformation unit 318, is added to the prediction value of the fourth group for reconstruction, and then is stored in the frame memory 322.

In the foregoing exemplary embodiment of the present invention, the first through fourth groups obtained by dividing the input block are sequentially predicted. In another exemplary embodiment of the present invention, processing orders of the second group and the third group are exchanged with each other and the pixels of the third group are predicted using reconstructed pixels of the first group and pixels of the second group are predicted using the reconstructed pixels of the first group and the third group.

Figure 16:
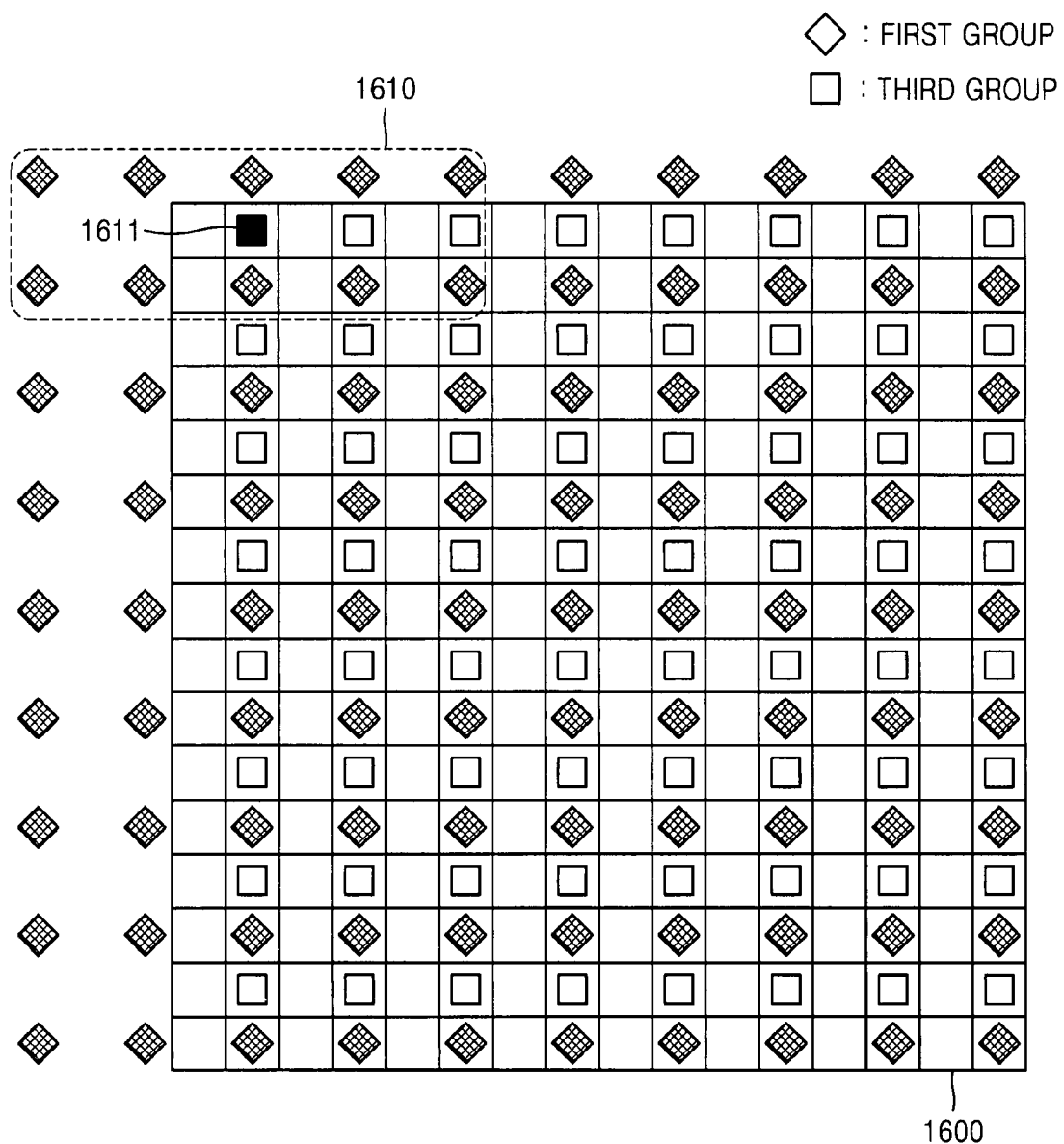
FIG. 16 illustrates pixels of the first group required for intraprediction with respect to the pixels of the third group according to another exemplary embodiment of the present invention.

FIG. 16 illustrates pixels of the first group required for intraprediction with respect to the pixels of the third group according to another exemplary embodiment of the present invention.

Referring to FIG. 16, the pixels of the third group are predicted using reconstructed pixels of the previously processed first group. For example, a pixel 1611 of the third group may be predicted using pixels of the first group included in the current block and a previously processed neighbor block in a dotted line 1610. Like the foregoing exemplary embodiment of the present invention, the direction determination unit 333 first determines a directivity around a pixel of the third group and predicts the pixel of the third group using reconstructed pixels of the first group corresponding to the determined directivity.

Figure 17:
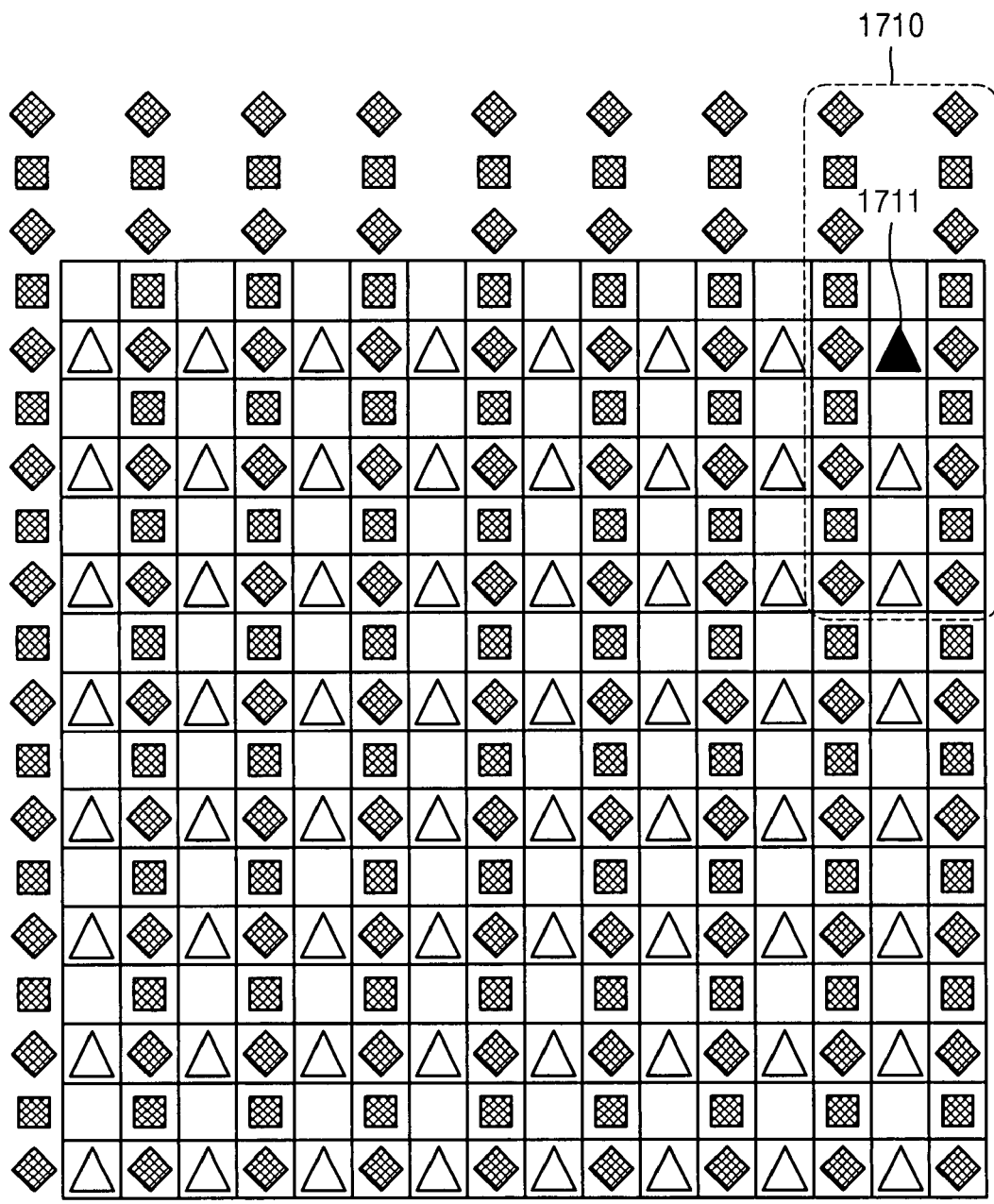
FIG. 17 illustrates pixels of the first and third groups required for intraprediction with respect to the pixels of the second group according to another exemplary embodiment of the present invention.

FIG. 17 illustrates pixels of the first and third groups required for intraprediction with respect to the pixels of the second group according to another exemplary embodiment of the present invention.

Referring to FIG. 17, the pixels of the second group are predicted using reconstructed pixels of the previously processed first group and third group. For example, a pixel 1711 of the second group may be predicted using pixels of the first group and the third group included in the current block and a previously processed neighbor block in a dotted line 1710. Like the foregoing exemplary embodiment of the present invention, the direction determination unit 333 first determines a directivity around a pixel of the second group and predicts the pixel of the second group using reconstructed pixels of the first group and the third group corresponding to the determined directivity.

Figure 18:
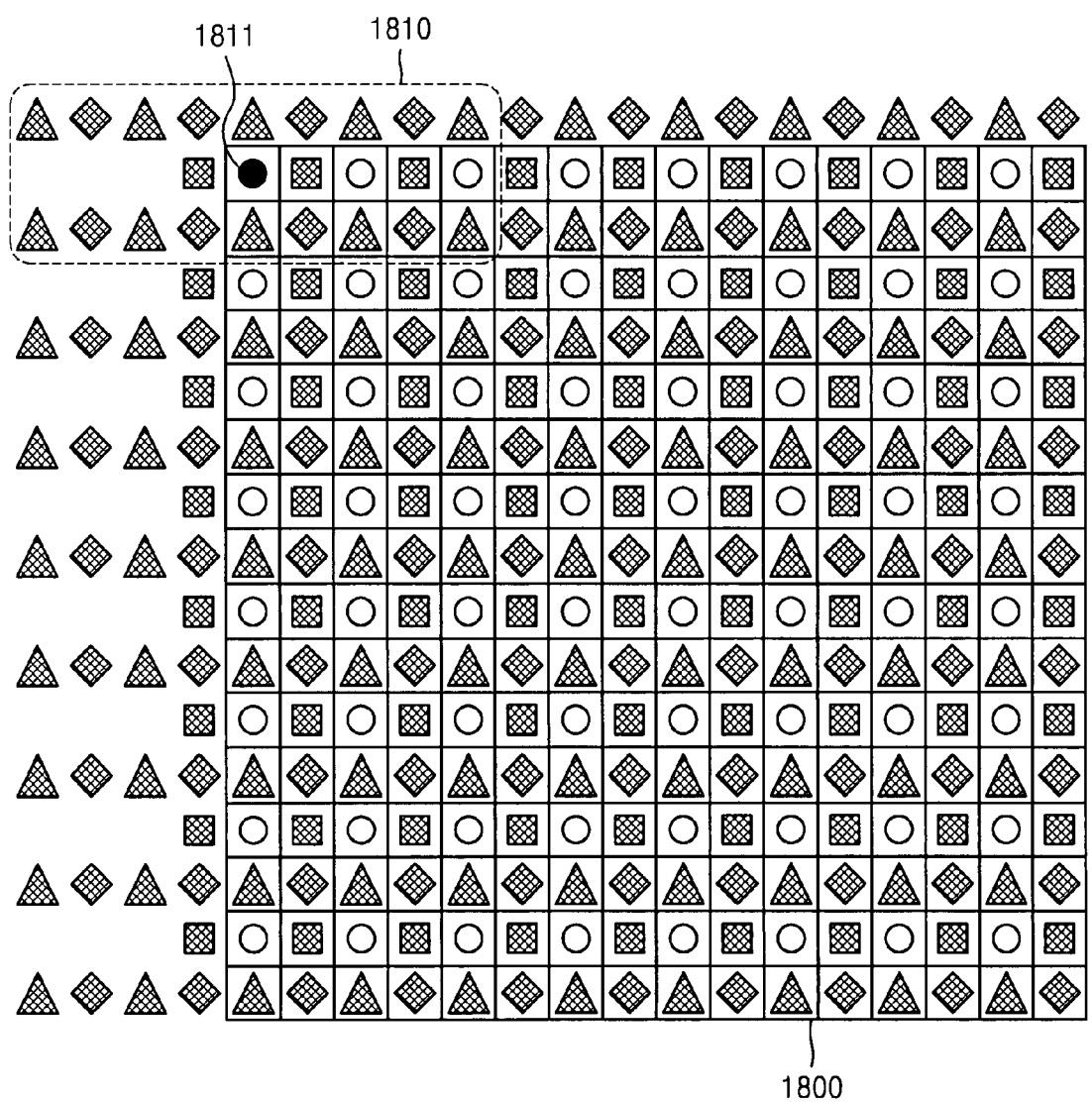
FIG. 18 illustrates pixels of the first through third groups required for intraprediction with respect to the pixels of the fourth group according to another exemplary embodiment of the present invention.

FIG. 18 illustrates pixels of the first through third groups required for intraprediction with respect to the pixels of the fourth group according to another exemplary embodiment of the present invention. Referring to FIG. 18, the pixels of the fourth group are predicted using reconstructed pixels of the previously processed first through third groups. For example, a pixel 1811 of the fourth group may be predicted using pixels of the first through third groups included in the current block and a previously processed neighbor block in a dotted line 1810.

Figure 19:
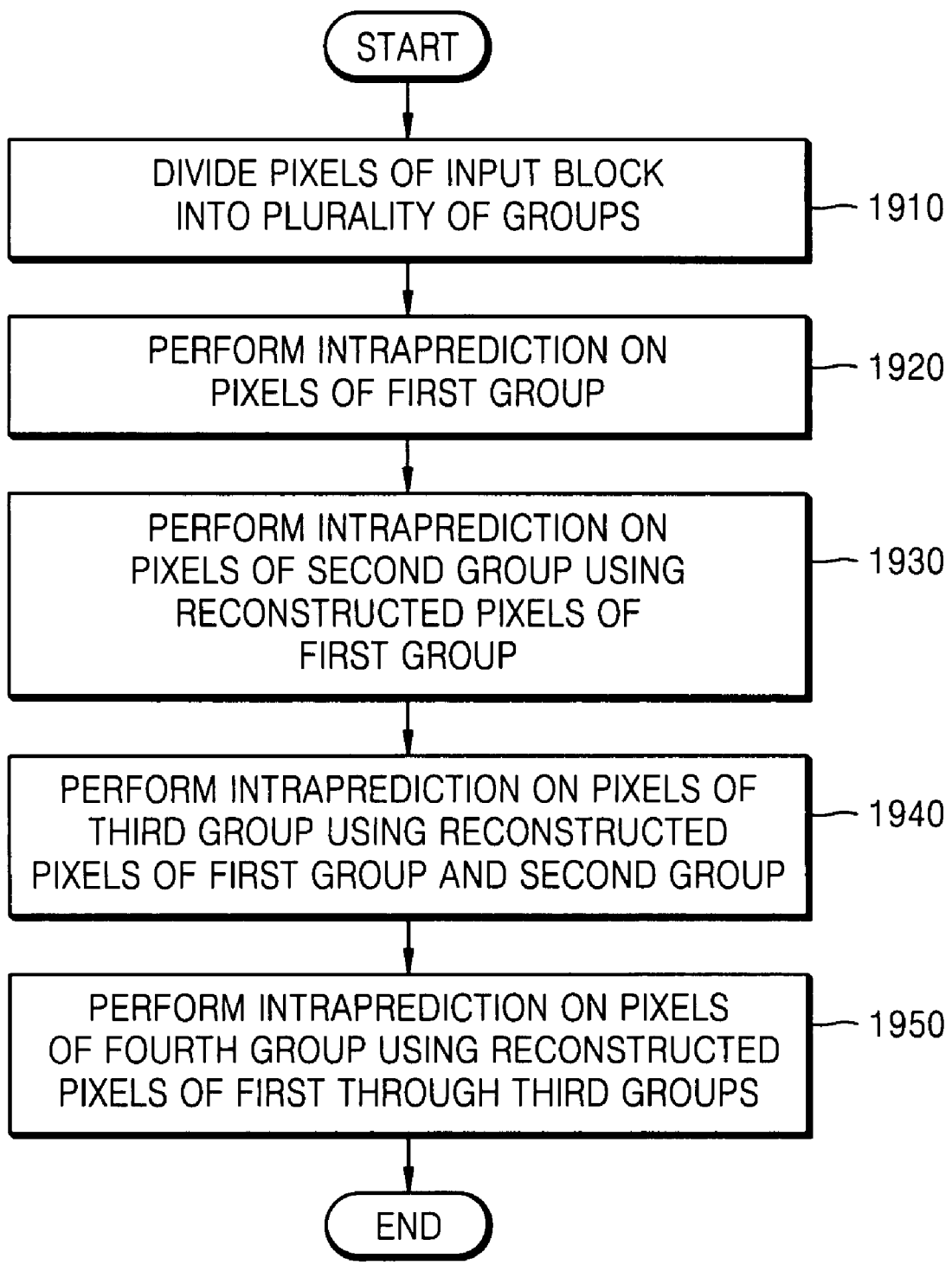
FIG. 19 is a flowchart illustrating a method of video intraprediction encoding according to an exemplary embodiment of the present invention.
Figure 20:
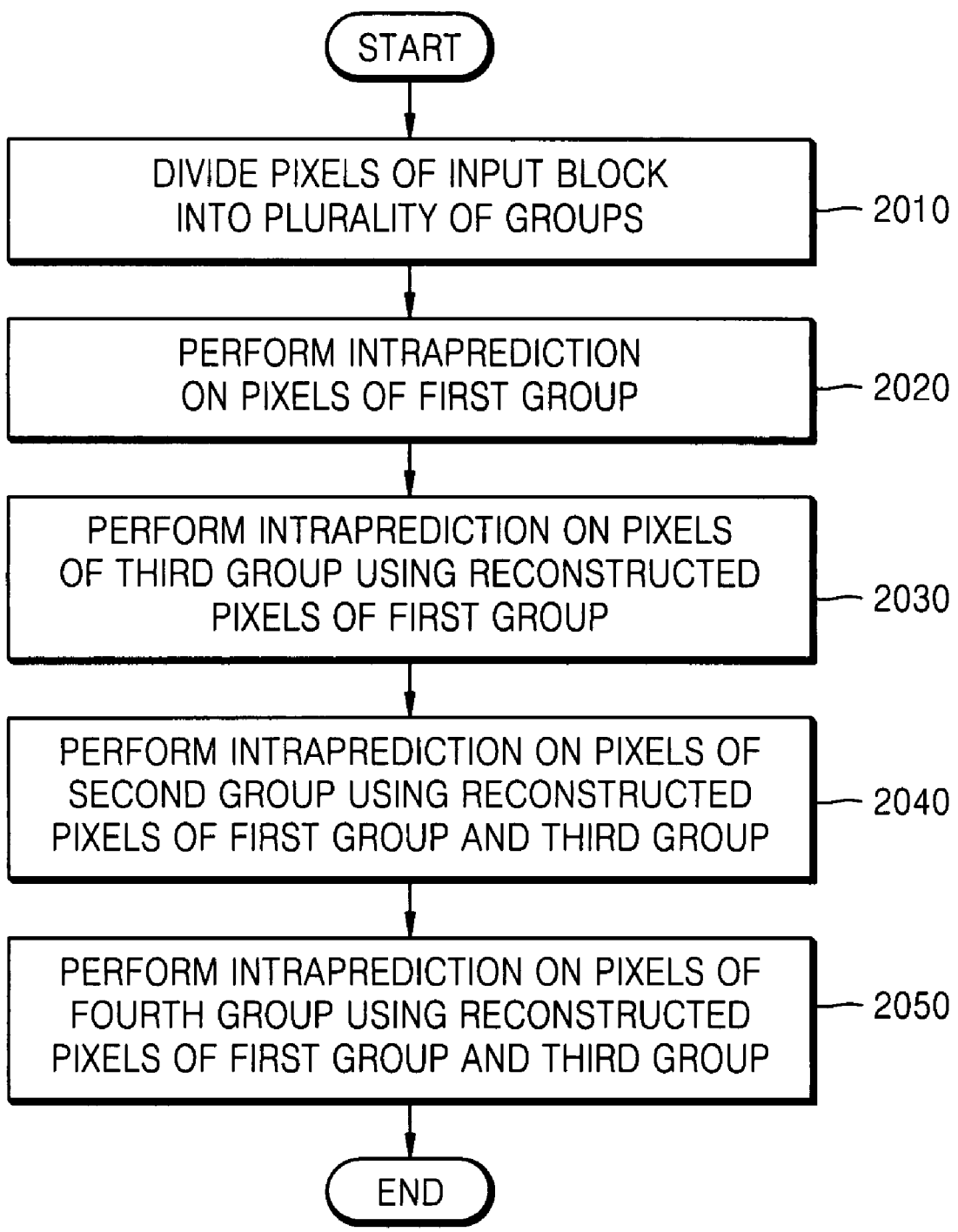
FIG. 20 is a flowchart illustrating a method of video intraprediction encoding according to another exemplary embodiment of the present invention.

FIG. 19 is a flowchart illustrating a method of video intraprediction encoding according to an exemplary embodiment of the present invention, and FIG. 20 is a flowchart illustrating a method of video intraprediction encoding according to another exemplary embodiment of the present invention.

Referring to FIG. 19, pixels of an input block are divided into a plurality of groups in operation 1910. In operation 1920, pixels of a first group among the plurality of groups are intrapredicted using pixels of a previously processed neighbor block of the input block. A residue between prediction values of the intrapredicted pixels of the first group and the original pixels of the input block is calculated and then transformed and quantized. The quantized residue is entropy-coded, together with prediction mode information. Inverse quantization and inverse transformation are performed on the quantized residue of the first group and the inversely transformed residue of the first group is added to the prediction values of the first group for reconstruction and then is stored in a memory. In operation 1930, pixels of a second group are intrapredicted using reconstructed pixels of the first group. Once prediction values of the intrapredicted pixels of the second group and prediction values of the original pixels of the second group are generated, a residue between the prediction values of the second group and the original pixels of the input block corresponding to the second group is calculated and undergoes transformation and quantization. The quantized residue is entropy-coded together with prediction mode information. Inverse quantization and inverse transformation are performed on the quantized residue of the second group and the inversely transformed residue of the second group is added to the prediction values of the second group for reconstruction and then is stored in the memory. In operation 1940, pixels of a third group are intrapredicted using reconstructed pixels of the first group and the second group. As mentioned above, a residue between prediction values of the third group and the original pixels of the input block corresponding to the third group is calculated and then transformed and quantized. The quantized residue is entropy-coded, together with prediction mode information. Inverse quantization and inverse transformation are performed on the quantized residue of the third group and the inversely transformed residue of the third group is added to the prediction values of the third group for reconstruction and then is stored in a memory. In operation 1950, pixels of a fourth group are intrapredicted using reconstructed pixels of the first through third groups.

Referring to FIG. 20, the method for video intraprediction encoding according to another exemplary embodiment of the present invention is similar to that according to the foregoing exemplary embodiment of the present invention except that the processing orders of the second group and the third group are exchanged with each other as mentioned above.

A residual value in intraprediction according to an exemplary embodiment of the present invention may be greater than that in intraprediction according to the related art. In this case, syntax information indicating application of the method for video intraprediction encoding according to an exemplary embodiment of the present invention may be added to a header of an encoded bitstream in units of a picture, a slice, or a group of pictures (GOP) in order to adaptively apply the method for video intraprediction encoding according to an exemplary embodiment of the present invention. For example, one-bit syntax is set for each 8×8 block and if the method for video intraprediction encoding according to an exemplary embodiment of the present invention is applied, 1 is added to the header of the bitstream and otherwise, 0 is added to the header of the bitstream. A bitstream encoded by the method for video intraprediction encoding according to an exemplary embodiment of the present invention is processed without separate direction mode information. This is because a direction can be determined using differences between absolute values of pixels of a neighbor block around a corresponding pixel during intraprediction decoding of the corresponding pixel according to an exemplary embodiment of the present invention.

In addition, in intraprediction according to an exemplary embodiment of the present invention, an encoding end and a decoding end may previously determine to classify groups according to directions, check, for example, the directivity coefficients D1 through D3 in a mode 1, the directivity coefficients D1 through D6 in a mode 2, and the directivity coefficients D1 through D9 in mode 3, instead of checking all directivities around each pixel of each group, and add the mode information to a header of a bitstream in units of a picture, a slice, or a GOP in video intraprediction encoding.

There may be other directivity determination methods having superior performance in addition to the directivity determination method described above. For example, it is assumed that there are N methods including a directivity determination method having low complexity and low performance through a directivity determination method having high complexity and high performance. In this case, an encoding end applies the N methods to each unit (each picture, each slice, or each GOP) to select the optimal method and index information indicating the selected method is added to a header of a bitstream in each unit for transmission to a decoding end.

Figure 21:
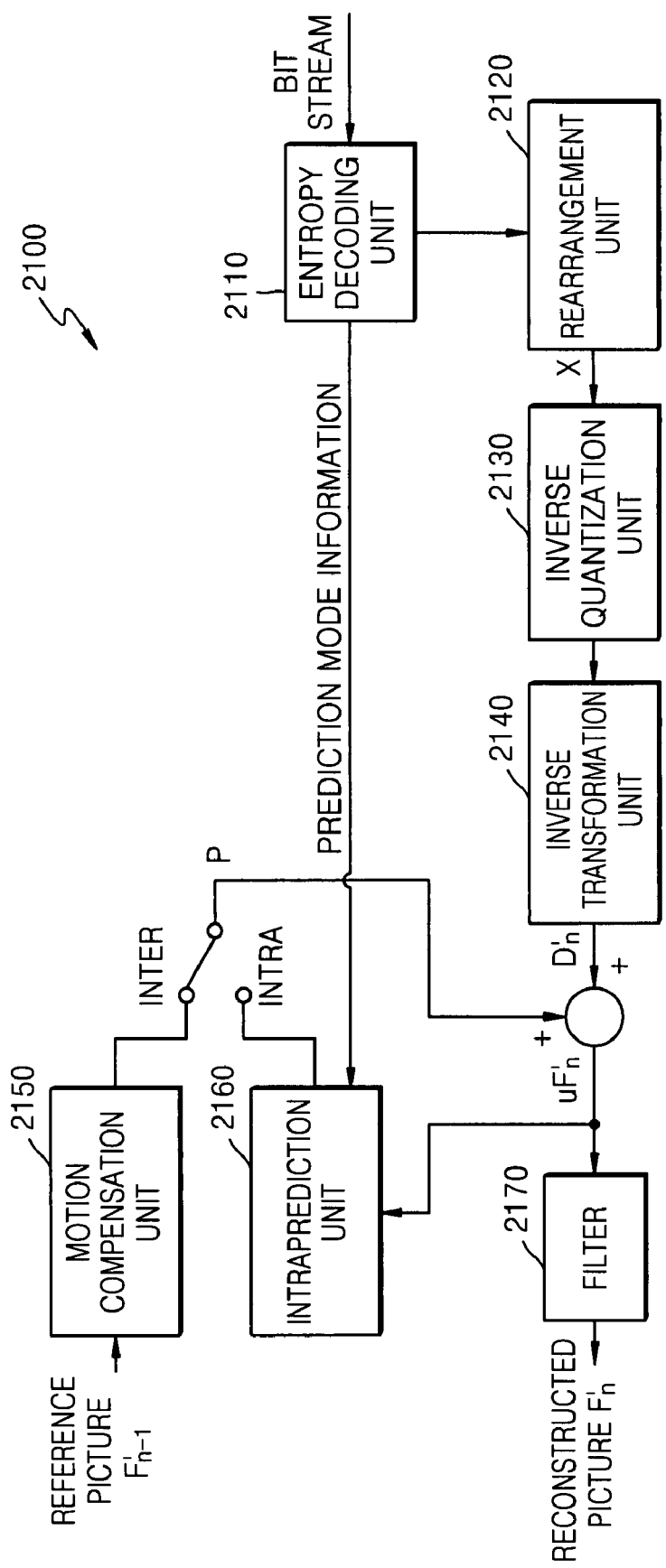
FIG. 21 is a block diagram of a video decoder which uses an apparatus for video intraprediction decoding according to an exemplary embodiment of the present invention.

FIG. 21 is a block diagram of a video decoder 2100 which uses an apparatus for video intraprediction decoding according to an exemplary embodiment of the present invention.

Referring to FIG. 21, the video decoder 2100 includes an entropy-decoding unit 2110, a rearrangement unit 2120, an inverse quantization unit 2130, an inverse transformation unit 2140, a motion compensation unit 2150, an intraprediction unit 2160, and a filter 2170. The intraprediction unit 2160 corresponds to the apparatus for video intraprediction decoding according to an exemplary embodiment of the present invention.

The entropy-decoding unit 2110 and the rearrangement unit 2120 receive a compressed bitstream and perform entropy decoding, thereby generating a quantized coefficient. The inverse quantization unit 2130 and the inverse transformation unit 2140 perform inverse quantization and an inverse transformation on the quantized coefficient, thereby extracting transformation encoding coefficients, motion vector information, header information, and intraprediction mode information. Here, the intraprediction mode information may include a predetermined syntax indicating whether the input bitstream is a bitstream that is divided into a plurality of groups for encoding by the method of video intraprediction encoding according to an exemplary embodiment of the present invention. As mentioned above, predicted direction information of pixels of each group can be calculated from differences between absolute values of pixels of a neighbor block and thus may not be included in the bitstream. The bitstream also may include mode information indicating a directivity used in actual encoding among a plurality of directivities.

The motion compensation unit 2150 and the intraprediction unit 2160 generate a predicted block according to an encoded picture type using the decoded header information, and the predicted block is added to an error $D'_n$ to generate $uF'_n$. The $uF'_n$ is processed by the filter 2170, and thus a reconstructed picture $F'_n$ is generated.

In particular, the intraprediction unit 2160 according to an exemplary embodiment of the present invention determines an intraprediction mode used in encoding the current block to be decoded using the intraprediction mode information included in the received bitstream. When the received bitstream has been intrapredicted by the method of video intraprediction encoding according to an exemplary embodiment of the present invention, the intraprediction unit 2160 performs intraprediction decoding on pixels of the first group and decodes pixels of the remaining groups using reconstructed pixels of previously processed groups.

Figure 22:
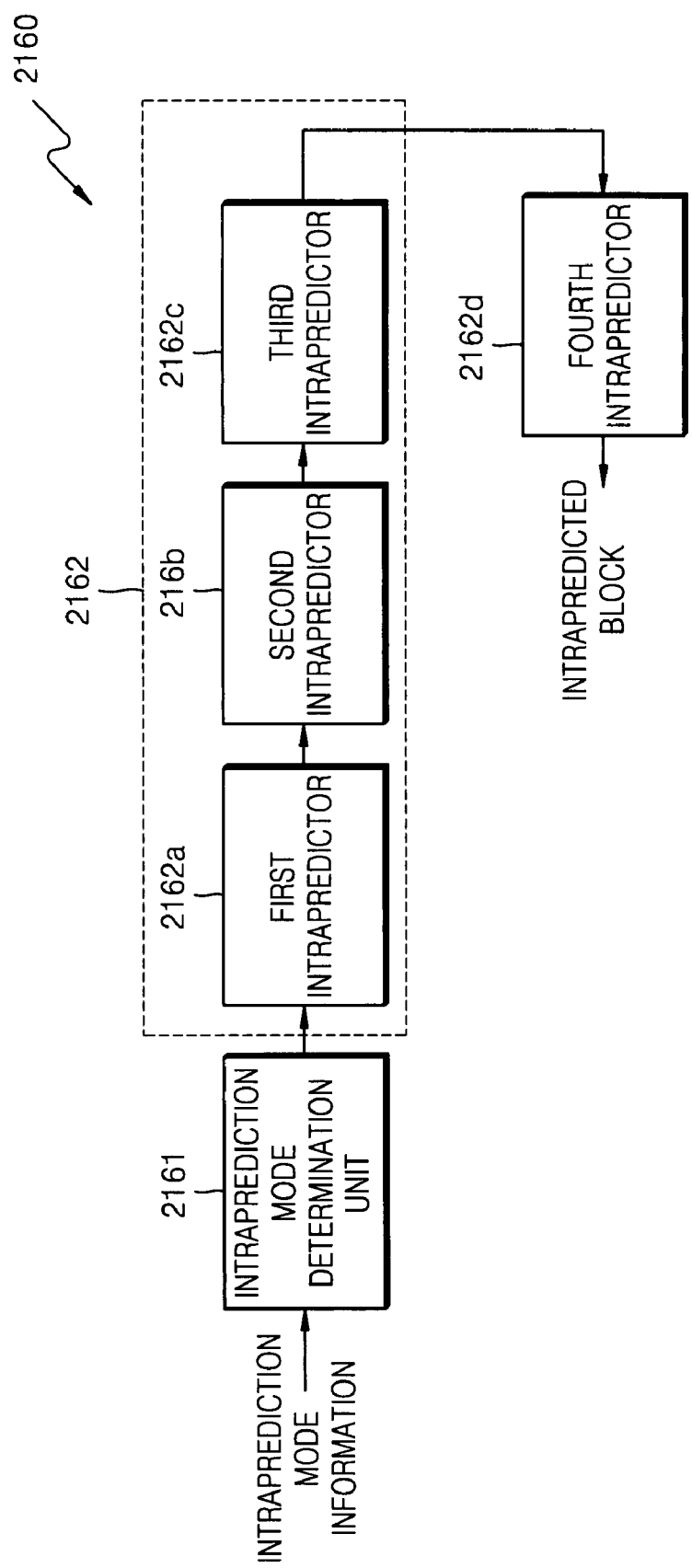
FIG. 22 is a block diagram of an intraprediction unit of FIG. 21 according to an exemplary embodiment of the present invention.

FIG. 22 is a block diagram of the intraprediction unit 2160 of FIG. 21 according to an exemplary embodiment of the present invention.

Referring to FIG. 22, the intraprediction unit 2160 includes an intraprediction mode determination unit 2161 and an intrapredictor 2162. The intrapredictor 2162 includes intrapredictors for processing groups obtained by dividing an input block. In FIG. 22, the input block is divided into four groups and the intrapredictor 2162 includes a first intrapredictor 2162a, a second intrapredictor 2162b, a third intrapredictor 2162c, and a fourth intrapredictor 2162d for processing the four groups.

The intraprediction mode determination unit 2161 determines, among various intraprediction modes including an intraprediction mode according to an exemplary embodiment of the present invention, an intraprediction mode in which the current block to be intraprediction-decoded has been intraprediction-encoded based on the intraprediction mode information extracted from the received bitstream in order to determine an intraprediction mode for the current block.

The first intrapredictor 2162a decodes encoded video data of the first group included in the received bitstream and outputs the decoded video data of the first group.

The second intrapredictor 2162b, the third intrapredictor 2162c, and the fourth intrapredictor 2162d determine directivities of pixels of the remaining groups by calculating differences between absolute values of neighbor pixels located at a predetermined angle with respect to pixels of the second through fourth groups, determines reference pixels among the decoded pixels of the first group and/or decoded pixels of previously processed other groups according to the determined directivities, and performs intraprediction decoding on the pixels of the second through fourth groups in units of a group using an average of the determined reference pixels.

Figure 23:
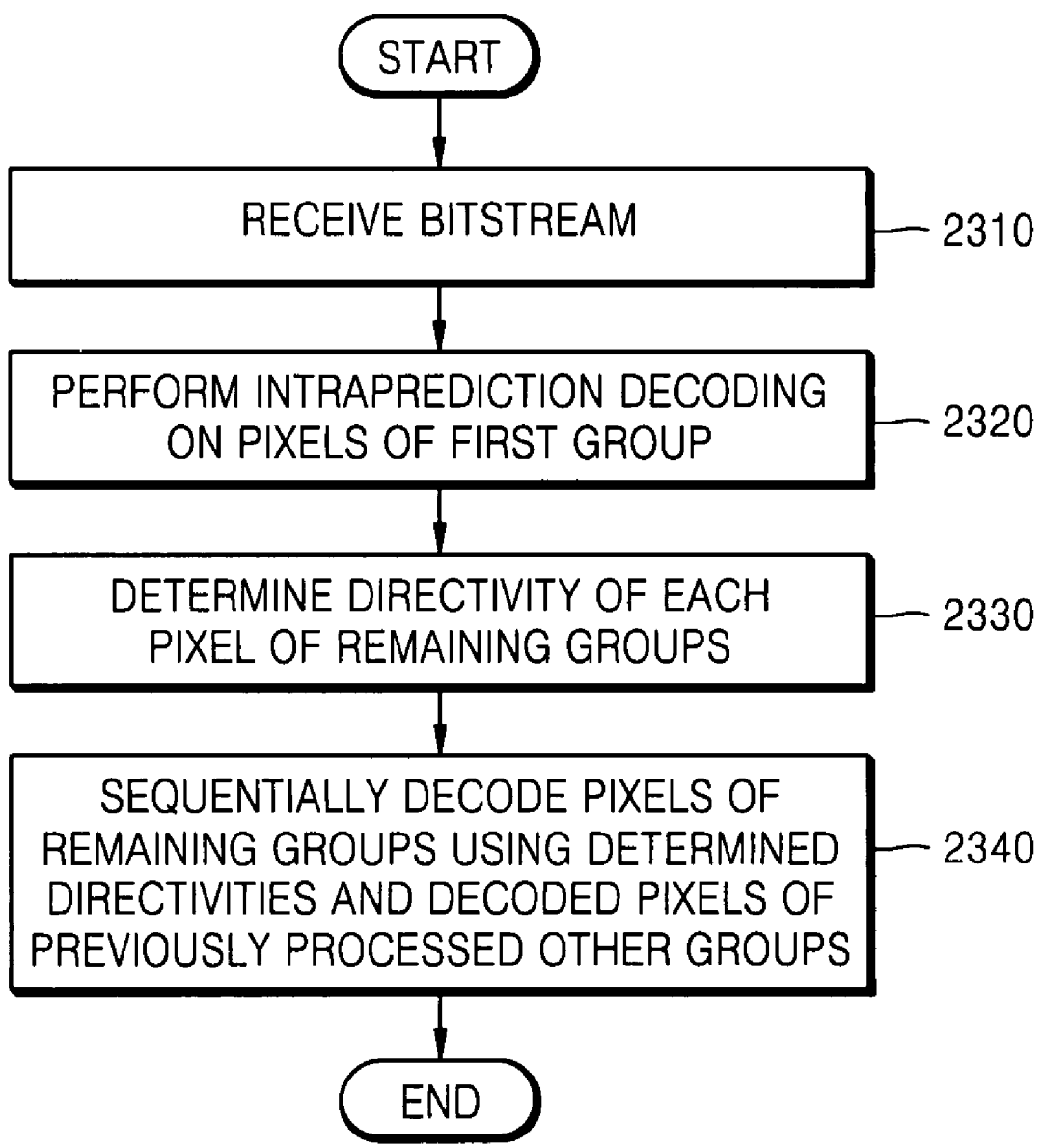
FIG. 23 is a flowchart illustrating a method of video intraprediction decoding according to an exemplary embodiment of the present invention.

FIG. 23 is a flowchart illustrating a method of video intraprediction decoding according to an exemplary embodiment of the present invention.

Referring to FIG. 23, in operation 2310, a bitstream is received. The bitstream includes data of pixels of a first group, which are intraprediction-encoded using pixels of a neighbor block, among a plurality of groups obtained by dividing an input block, and data of pixels that are intraprediction-encoded using reconstructed pixels of the first group and reconstructed pixels of previously processed other groups.

In operation 2320, intraprediction decoding is performed on the received pixels of the first group. The directivity of each pixel of the remaining groups is determined in operation 2330 and pixels of the remaining groups are predicted using the decoded pixels of the first group and decoded pixels of previously processed other groups according to the determined directivity.

The present invention may also be applied to coding in not only a YUV region but also an RGB region. In H.264 High 444 profile or Advanced 444 profile that is being standardized by the MPEG, residual color transform (RCT) is considered. More information about RCT is mentioned in detail in JVT document "Text of ISO/IEC 14496 10 Advanced Video Coding $3^{rd}$ Edition" (ISO/IEC JTC 1/2C 29/WG 11 N6540) released in July 2004. According to the related art, video data of RGB components are transformed into another color space like YCbCr for encoding and video data of YCbCr components is reconstructed and the reconstructed video data of the YCbCr components is transformed into an RGB color space for decoding, thereby causing color distortion during the color format transformation. To reduce color distortion during the color format transformation, RCT for video encoding and decoding in the RGB region is being studied.

By applying RCT to an exemplary embodiment of the present invention, RCT may be performed immediately before transformation of residue blocks for groups divided according to an exemplary embodiment of the present invention in the RGB region during video encoding. A decoding end performs inverse RCT immediately after inverse transformation. The remaining processes are the same as described above.

More specifically, when RCT is applied to an exemplary embodiment of the present invention, pixels of an input block are divided into a plurality of groups for each color component in the RGB color space. Next, pixels of a first group among the plurality of groups are predicted using pixels of a previously processed neighbor block. A residue for the predicted pixels of the first group is generated and RCT is performed on the residue of the predicted pixels of the first group. DCT, quantization, and entropy-encoding are performed on the RCT transformed residue of the pixels of the first group for encoding. The encoded pixels of the first group are reconstructed and then stored in a memory for use in prediction of pixels of the remaining groups. As mentioned above, after directivities of pixels of the remaining groups are determined, the pixels of the remaining groups are predicted using the reconstructed pixels of the first group and reconstructed pixels of previously processed other groups according to the determined directivities. A residue of the predicted pixels of the remaining groups is generated by subtracting a prediction value from a corresponding region of the original video, color transformation is performed on the generated residue, and the color transformed residue is encoded.

The exemplary embodiments of present invention may also be applied to another color transformation involving color transformation on a residue in addition to RCT is involves color transformation on a residue.

The exemplary embodiments of present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

As described above, according to exemplary embodiments of the present invention, a correlation between pixels of the current block as well as a neighbor block of the current block are used for video intraprediction, thereby improving prediction efficiency and coding efficiency.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of video intraprediction encoding, the method comprising:
   dividing, by a processor, pixels of an input block into a plurality of groups;
   performing, by the processor, intraprediction encoding on pixels of a first group among the plurality of groups using pixels of a previously processed neighbor block;
   reconstructing, by the processor, the intraprediction-encoded pixels of the first group; and sequentially performing, by a processor, intraprediction encoding on pixels of remaining groups in units of a group according to a predetermined order,
   wherein intraprediction encoding on pixels of a remaining group comprises:
   determining, by the processor, directivities of pixels of remaining groups using the reconstructed pixels of the first group and reconstructed pixels of previously processed other groups; and
   performing, by the processor, predictive encoding on the pixels of the remaining groups using the reconstructed pixels of the first group and the reconstructed pixels of the previously processed other groups according to the determined directivities.

2. The method of claim 1, wherein the determination of the directivities comprises:
   setting a plurality of directions with respect to each pixel of the remaining groups and calculating averages of differences between absolute values of neighbor pixels of the each pixel of the remaining groups according to each of the plurality of directions; and
   comparing the calculated averages according to the plurality of directions to determine a direction of the plurality of directions having a smallest average of the calculated averages.

3. The method of claim 1, wherein the performing of the predictive encoding comprises:
   determining reference pixels among the pixels of the first group and the pixels of the previously processed other groups; and
   predicting the pixels of the remaining groups using an average of the determined reference pixels.

4. The method of claim 1, wherein the input block has a size of M×N where M=2m, N=2n, and m and n are positive integers, and is divided into a first group including pixels in even-numbered rows and even-numbered among pixels of the input block, a second group including pixels located on the left and right sides of the pixels of the first group, a third group including pixels located above and below the pixels of the first group, and a fourth group including the remaining pixels that are not included in the first through third groups.

5. The method of claim 4, wherein the pixels of the remaining groups are processed in an order of the second group, then the third group, and then the fourth group.

6. The method of claim 4, wherein the pixels of the remaining groups are processed in an order of the third group, then the second group, and then the fourth group.

7. The method of claim 1, further comprising adding intraprediction mode information including directivity information used in the intraprediction encoding to a header of a bitstream.

8. An apparatus for video intraprediction encoding, the apparatus comprising:
   a block division unit which divides pixels of an input block into a plurality of groups;
   a direction determination unit which determines directivities of pixels of the plurality of groups; and
   an intraprediction unit which performs intraprediction encoding on pixels of a first group among the plurality of groups using pixels of a previously processed neighbor block, sequentially processes pixels of remaining groups in units of a group according to a predetermined order, and performs predictive encoding on the pixels of the remaining groups using reconstructed pixels of the first group and reconstructed pixels of the previously processed other groups according to the determined directivities.

9. The apparatus of claim 8, wherein the directivity determination unit sets a plurality of directions with respect to a first pixel and calculates an average of differences between absolute values of neighbor pixels of the first pixel according to each of the plurality of directions and compares calculated averages according to the plurality of directions to determine a direction of the plurality of directions having a smallest average of the calculated averages.

10. The apparatus of claim 8, wherein the intraprediction unit determines reference pixels among the pixels of the first group and the pixels of the previously processed other groups and predicts the pixels of the remaining groups using an average of the determined reference pixels.

11. The apparatus of claim 8, wherein the input block has a size of M×N where M=2m, N=2n, and m and n are positive integers, and is divided into a first group including pixels in even-numbered rows and even-numbered among pixels of the input block, a second group including pixels located on the left and right sides of the pixels of the first group, a third group including pixels located above and below the pixels of the first group, and a fourth group including the remaining pixels that are not included in the first through third groups.

12. The apparatus of claim 11, wherein the pixels of the remaining groups are processed in an order of the second group, then the third group, and then the fourth group.

13. The apparatus of claim 11, wherein the pixels of the remaining groups are processed in an order of the third group, then the second group, and then the fourth group.

14. The apparatus of claim 8, wherein the intraprediction unit adds intraprediction mode information including directivity information used in the intraprediction encoding to a header of a bitstream.

15. A method of video intraprediction decoding, the method comprising:
 receiving a bitstream including data of pixels of a first group, which are intraprediction-encoded using pixels of a neighbor block, among a plurality of groups obtained by dividing an input block, and data of pixels that are intraprediction-encoded using reconstructed pixels of the first group and reconstructed pixels of previously processed other groups;
 determining, by a processor, directivities of pixels of remaining groups; and
 predicting, by a processor, the pixels of the remaining groups using decoded pixels of the first group and pixels of previously decoded other groups according to the determined directivities.

16. The method of claim 15, wherein the determination of the directivities comprises:
 calculating averages of differences between absolute values of neighbor pixels of a first pixel that are located at predetermined angle directions with respect to the first pixel; and
 comparing calculated averages according to the predetermined angle directions to determine a direction of the predetermined angle directions having a smallest average of the calculated averages.

17. The method of claim 15, wherein the prediction of the pixels of the remaining groups comprises determining reference pixels among the pixels of the first group and the pixels of the previously processed other groups and predicting the pixels of the remaining groups using an average of the determined reference pixels.

18. An apparatus for video intraprediction decoding, the apparatus comprising:
 an intraprediction mode determination unit which receives a bitstream including data of pixels of a first group, which are intraprediction-encoded using pixels of a neighbor block, among a plurality of groups obtained by dividing an input block, and data of pixels that are intraprediction-encoded using reconstructed pixels of the first group and reconstructed pixels of previously processed other groups and determines an intraprediction mode using intraprediction mode information included in the received bitstream; and
 an intraprediction unit which performs intraprediction decoding the pixels of the first group, determines directivities of pixels of the remaining groups, and predicts the pixels of the remaining groups using the decoded pixels of the first group and the decoded pixels of the previously processed other groups according to the determined directivities.

19. The apparatus of claim 18, wherein the intraprediction unit calculates an average of differences between absolute values of neighbor pixels of a first pixel that are located at predetermined angle directions with respect to the first pixel and compares calculated averages according to the predetermined angle directions to determine a direction of the predetermined angle directions having a smallest average of the calculated averages.

20. The apparatus of claim 18, wherein the intraprediction unit determines reference pixels among the pixels of the first group and the pixels of the previously processed other groups and predicts the pixels of the remaining groups using an average of the determined reference pixels.

21. A method of video intraprediction encoding, the method comprising:
 dividing, by a processor, pixels of an input block into a plurality of groups, for each color component in a predetermined color space;
 predicting, by the processor, pixels of a first group among the plurality of groups using pixels of a previously processed neighbor block;
 generating, by the processor, a residue of the predicted pixels of the first group, performing color transformation on the generated residue, and encoding the color transformed residue;
 reconstructing, by the processor, encoded pixels of the first group;
 determining, by the processor, directivities of pixels of remaining groups using the reconstructed pixels of the first group and reconstructed pixels of previously processed other groups; and
 predicting, by the processor, pixels of the remaining groups using the reconstructed pixels of the first group and the reconstructed pixels of the previously processed other groups, according to the determined directivities; and
 generating, by the processor, a residue of the predicted pixels of the remaining groups, performing color transformation on the generated residue, and encoding the color transformed residue,
 wherein the pixels of the remaining groups are sequentially processed in units of a group according to a predetermined order.

22. The method of claim 21, wherein the predetermined color space is an RGB color space.

* * * * *